(12) United States Patent
Kim et al.

(10) Patent No.: US 11,740,751 B2
(45) Date of Patent: Aug. 29, 2023

(54) TOUCH SENSING UNIT AND DISPLAY DEVICE INCLUDING SAME

(71) Applicant: SAMSUNG DISPLAY CO., LTD., Yongin-si (KR)

(72) Inventors: Hyung Bae Kim, Hwaseong-si (KR); Sang Kook Kim, Cheonan-si (KR); Tae Joon Kim, Seongnam-si (KR); Hyun Jae Lee, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/807,672

(22) Filed: Jun. 17, 2022

(65) Prior Publication Data

US 2023/0093856 A1 Mar. 30, 2023

(30) Foreign Application Priority Data

Sep. 29, 2021 (KR) .......................... 10-2021-0128683

(51) Int. Cl.
*G06F 3/044* (2006.01)

(52) U.S. Cl.
CPC .......... *G06F 3/0446* (2019.05); *G06F 3/0445* (2019.05)

(58) Field of Classification Search
CPC .. G06F 3/0446; G06F 3/0445; G06F 345/173; G06F 345/174
See application file for complete search history.

(56) References Cited

U.S. PATENT DOCUMENTS

| 10,884,568 | B2 | 1/2021 | Seo et al. |
| 2016/0239131 | A1* | 8/2016 | Kang .................... G06F 3/0446 |
| 2019/0051708 | A1 | 2/2019 | Jeong et al. |
| 2020/0012387 | A1 | 1/2020 | Kim et al. |
| 2020/0159369 | A1 | 5/2020 | Seo et al. |
| 2022/0069052 | A1* | 3/2022 | Liu ..................... H01L 27/3246 |

FOREIGN PATENT DOCUMENTS

| KR | 10-2018-0131799 | 12/2018 |
| KR | 10-2018-0131815 | 12/2018 |
| KR | 10-2019-0001977 | 1/2019 |
| KR | 10-2020-0005707 | 1/2020 |

\* cited by examiner

*Primary Examiner* — Deeprose Subedi
(74) *Attorney, Agent, or Firm* — F. Chau & Associates, LLC

(57) ABSTRACT

A touch sensing unit includes a first electrode including a plurality of first main patterns arranged in a first direction and a first outer pattern arranged on one sides of the plurality of first main patterns, a second electrode including a plurality of second main patterns arranged in a second direction intersecting the first direction and a second outer pattern arranged on one sides of the plurality of second main patterns, a first compensation pattern extending along an edge of the first outer pattern, and a first signal wire connected to at least one of the first outer pattern and the first compensation pattern. The first compensation pattern includes a first compensation connection part protruding toward the first outer pattern and connected to the first outer pattern.

20 Claims, 24 Drawing Sheets

(a)

(b)

(c)

(a)

(b)

TOUCH SENSING UNIT AND DISPLAY DEVICE INCLUDING SAME

CROSS-REFERENCE TO RELATED APPLICATION(S)

This application claims priority under 35 USC § 119 to Korean Patent Application No. 10-2021-0128683 filed on Sep. 29, 2021 in the Korean Intellectual Property Office, the disclosure of which is herein incorporated by reference in its entirety.

TECHNICAL FIELD

The disclosure relates to a display and, more particularly, to a touch sensing unit and a display device including the same.

DISCUSSION OF THE RELATED ART

Display devices have been applied to various electronic devices such as smart phones, digital cameras, laptop computers, vehicle navigation systems, smart watches, and smart televisions. Examples of display devices may include liquid crystal display (LCD) devices, field emission display (FED) devices, organic light emitting diode (OLED) display devices, and the like.

Many devices such as smart phones and tablet computers utilize touch screen display device that incorporate a touch sensing unit. The touch sensing unit determines whether a touch of a user is input using a plurality of sensor electrodes and calculates a corresponding location as touch input coordinates.

As planar shapes of the display devices are diversified, the areas of sensing electrodes may differ from each other. For example, when the display device has a circular shape, an elliptical shape, or an atypical planar shape, the sensing electrode located at an edge part (or an outer side) of the display device may have a shape that is equivalent to only a portion of a sensing electrode located at an inner side of the display device. When the sensing electrodes have different areas, touch sensing signals sensed by the sensing electrodes may be different. In this case, a touch may be recognized even when no actual touch has occurred.

SUMMARY

A touch sensing unit includes a first electrode including a plurality of first main patterns arranged in a first direction and a first outer pattern arranged on one side of the plurality of first main patterns. A second electrode including a plurality of second main patterns is arranged in a second direction intersecting the first direction and a second outer pattern is arranged on one side of the plurality of second main patterns. A first compensation pattern extends along an edge of the first outer pattern. A first signal wire is connected to the first outer pattern and/or the first compensation pattern. The first compensation pattern includes a first compensation connection part protruding toward the first outer pattern and connected to the first outer pattern.

The first compensation connection part may overlap the first outer pattern in a plan view.

The touch sensing unit may further include a touch sensing area that senses a touch, and a touch peripheral area disposed around the touch sensing area. The first electrode and the second electrode may be arranged in the touch sensing area, and the first signal wire may be disposed in the touch peripheral area.

The first compensation pattern may include a first compensation peripheral part disposed between the first outer pattern and the first signal wire.

The first compensation peripheral part may be disposed within the touch peripheral area.

The touch sensing unit may further include a second compensation pattern extending along an edge of the second outer pattern, and a second signal wire connected to the second outer pattern and/or the second compensation pattern. The first compensation peripheral part may be disposed between the first signal wire and the second signal wire.

The touch sensing unit may further include a guard wire disposed between the first signal wire and the second signal wire.

An area of the first compensation pattern may be greater than an area of the first outer pattern.

An area of the first outer pattern may be smaller than an area of the first main pattern.

The touch sensing unit may further include a substrate, a first touch conductive layer disposed on the substrate, a first touch insulating layer disposed on the first touch conductive layer, and a second touch conductive layer disposed on the first touch insulating layer. The first touch conductive layer may include the first signal wire and the second signal wire, and the second touch conductive layer may include the first main pattern, the second main pattern, the first outer pattern, and the second outer pattern.

The second outer pattern may include a protrusion part protruding toward the first outer pattern.

The second outer pattern may be disposed between the first compensation pattern and the first main pattern in the second direction.

A touch sensing unit includes a first electrode including a plurality of first main patterns arranged in a first direction and a first outer pattern arranged on one side of the plurality of first main patterns. A second electrode including a plurality of second main patterns is arranged in a second direction intersecting the first direction and a second outer pattern is arranged on one side of the plurality of second main patterns. A third electrode includes a plurality of third main patterns arranged in the first direction and a third outer pattern arranged on one sides of the plurality of third main patterns. A first compensation pattern extends along edges of the first outer pattern and the third outer pattern. The first compensation pattern is electrically connected to the first outer pattern.

The first electrode and the third electrode may be adjacent to each other in the second direction.

A touch sensing unit may further include a second compensation pattern connected to the second outer pattern. The second compensation pattern may be arranged along edges of the first outer pattern, the second outer pattern, and the third outer pattern.

A display device includes a display panel including a light emitting element layer including light emitting elements that emit light and a touch sensing layer disposed on the light emitting element layer, and a window disposed on the display panel and including a light blocking member. The touch sensing layer includes: a first electrode including a plurality of first main patterns arranged in a first direction and a first outer pattern arranged on one side of the plurality of first main patterns, a second electrode including a plurality of second main patterns arranged in a second direction intersecting the first direction and a second outer pattern arranged on one side of the plurality of second main patterns, and a first compensation pattern connected to the first outer pattern. The first compensation pattern overlaps the light blocking member.

The first compensation pattern may include a first compensation peripheral part extending along an edge of the first outer pattern and a first compensation connection part protruding from the first compensation peripheral part to the first outer pattern and connected to the first outer pattern.

The first compensation peripheral part may overlap the light blocking member.

At least a portion of the first compensation connection part may overlap the light blocking member.

At least another portion of the first compensation connection part may overlap the first outer pattern.

BRIEF DESCRIPTION OF THE DRAWINGS

The above and other aspects and features of the disclosure will become more apparent by describing embodiments thereof in detail with reference to the attached drawings, in which.

DETAILED DESCRIPTION OF THE EMBODIMENTS

The invention will be described with reference to perspective views, cross-sectional views, and/or plan views, in which various embodiments of the invention are shown.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms "first," "second," etc. may be used herein to describe various elements, these elements should not necessarily be limited by these terms. These terms are used to distinguish one element from another element. For instance, a first element discussed below could be termed a second element without departing from the teachings of the invention. Similarly, the second element could also be termed the first element.

Hereinafter, detailed embodiments of the disclosure will be described with reference to the accompanying drawings.

Figure 1:
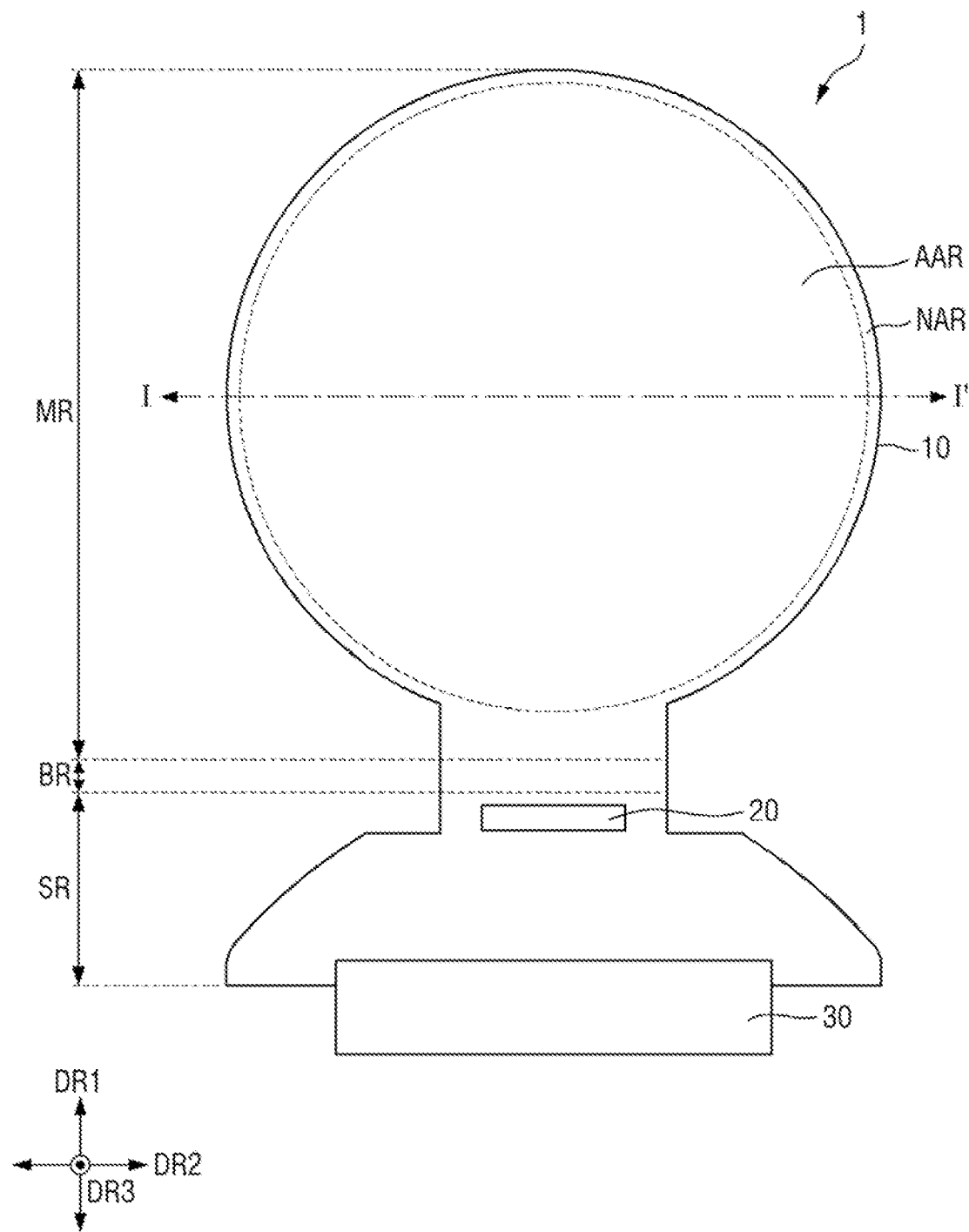
FIG. 1 is a plan view of a display device according to an embodiment of the disclosure.
Figure 2:
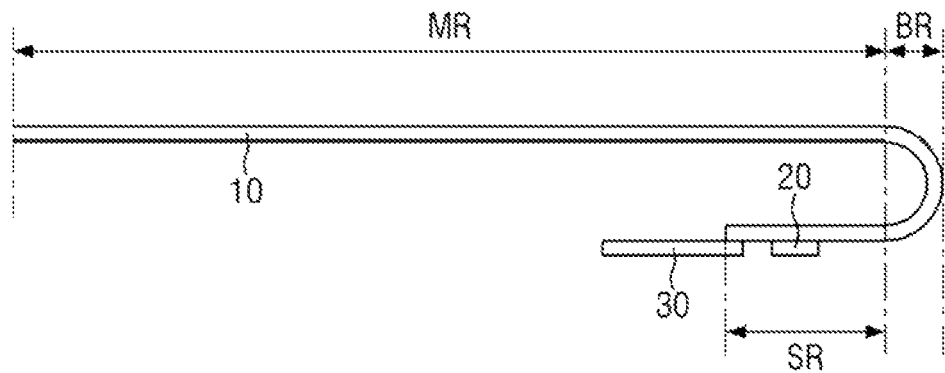
FIG. 2 is a schematic cross-sectional view of a display panel according to an embodiment of the disclosure.

FIG. 1 is a plan view of a display device according to one embodiment of the disclosure, and FIG. 2 is a schematic cross-sectional view of a display panel according to one embodiment of the disclosure.

In an embodiment of the disclosure, a first direction DR1 and a second direction DR2 intersect each other. The first direction DR1 may be a vertical direction of a display device 1, and the second direction DR2 may be a horizontal direction of the display device 1, but the embodiments of the specification are not necessarily limited thereto. In the following embodiments, one side of the first direction DR1 refers to an upward direction in a plan view, the other side of the first direction DR1 refers to a downward direction in a plan view, one side of the second direction DR2 refers to a rightward direction in a plan view, and the other side of the second direction DR2 refers to a leftward direction in a plan view.

A third direction DR3 is a direction intersecting a plane on which the first direction DR1 and the second direction DR2 are placed and perpendicularly intersects both the first direction DR1 and the second direction DR2. However, it should be understood that directions described in the embodiments refer to relative directions, and the embodiments are not necessarily limited to the described directions.

Unless otherwise defined, in the specification, the terms "upper part" and "upper surface" expressed with respect to the third direction DR3 refer to a side of a display surface with respect to a display panel 10, and the terms "lower part," "lower surface," and "rear surface" refer to a side opposite to the display surface with respect to the display panel 10.

Referring to FIGS. 1 and 2, the display device 1 may include various electronic devices that provide a display screen. Although the disclosure is not necessarily limited thereto, examples of the display device may include a mobile phone, a smart phone, a tablet computer, a mobile communication terminal, an electronic notebook, an electronic book, a personal digital assistant (PDA), a portable multimedia player (PMP), a vehicle navigation device, an ultra mobile PC (UMPC), a television, a game console, a smart watch, a head mount display (HMD), a computer monitor, a laptop, a car dashboard, a digital camera, a camcorder, an external billboard, an electronic billboard, various medical devices, various inspection device, various home appliances, such as a refrigerator or a washing machine, including display regions, an Internet of Things (IoT) device, and the like.

The display device 1 may include a non-quadrilateral shape. The non-quadrilateral shape may be, for example, a circular shape, an elliptical shape, a polygonal shape of which a part has a circular shape, a quadrilateral shape having round-shaped corners, and the like. In the embodiment, it is exemplified that the display device 1 includes a circular shape in a plan view.

The display device 1 may include the display panel 10, a panel drive unit 20, and a circuit board 30.

The display panel 10 may include a display area DA on which an image is displayed and a non-display area on which an image is not displayed.

The display area DA of the display panel 10 may include a plurality of pixels for displaying an image and may overlap a touch sensing area ("TSA" in FIG. 4) in which a touch input is sensed, which will be described below.

The non-display area NDA of the display panel 10 may be disposed around the display area DA (e.g., the non-display area NDA may at least partially surround the display area DA). The non-display area NDA may be a bezel area. Signal wires or driving circuits for applying a signal to the display area DA or the touch sensing area TSA may be arranged in the non-display area NDA. However, the disclosure is not necessarily limited thereto, and for example, the non-display area NDA might not be disposed in a peripheral area of the display area DA.

In one embodiment of the disclosure, the non-display area NDA might not overlap the touch sensing area TSA. In an embodiment of the disclosure, a part of the non-display area NDA may overlap the touch sensing area TSA.

The display area DA may have a non-rectangular shape. The non-quadrilateral shape may be, for example, a circular shape, an elliptical shape, a polygonal shape of which a part has a circular shape, a quadrilateral shape having round-shaped corners, and the like. In the embodiment, it is exemplified that the display area DA has a circular shape in a plan view, but the disclosure is not necessarily limited thereto.

The display panel 10 may include a main region MR, a bending region BR in which the display panel is bent, a sub-region SR protruding from the bending region BR. The main region MR may have a shape substantially similar to an exterior of the display device 1 in a plan view. At least a part of the main region MR may have a circular shape in a plan view.

The main region MR may include the display area DA. The display area DA may be disposed inside the main region MR. In one embodiment of the disclosure, a peripheral edge portion of the display area DA and the entire sub-region SR in the main region MR may be the non-display area NDA. However, the disclosure is not necessarily limited thereto, and at least a portion of the bending region BR or the sub-region SR may include the display area DA.

The bending region BR is connected to the other side of the main region MR in the first direction DR1. In the bending region BR, the display panel 10 may be bent with a curvature in a downward direction in a thickness direction, for example, in a direction opposite to the display surface.

The sub-region SR may extend from the bending region BR and protrude from the main region MR to the other side in the first direction DR1. The sub-region SR of the bent display panel 10 may overlap the display area DA in the thickness direction, but the disclosure is not necessarily limited thereto.

The display panel 10 may be divided, with respect to the bending region BR, into the main region MR located on one side of the bending region BR in the first direction DR1 and the sub-region SR located on the other side of the bending region BR in the first direction DR1.

The panel drive unit 20 may be disposed on the sub-region SR of the display panel 10. The panel drive unit 20 may include an integrated circuit that drives the display panel 10. The panel drive unit 20 may output signals and voltages that drive the display panel 10. The panel drive unit 20 may be mounted on one surface of the display panel 10 that is the same surface as the display surface and may be mounted on the surface of the display panel 10 that faces downward in the thickness direction as the bending region BR is bent and inverted as described above, and thus an upper surface of the panel drive unit 20 may face downward.

The panel drive unit 20 may be attached to the display panel 10 through an anisotropic conductive film or attached to the display panel 10 through an ultrasonic bonding method.

The circuit board 30 may be connected to the sub-region SR of the display panel 10. The circuit board 30 may be a flexible printed circuit board (FPCB) or a film. The circuit board 30 may be an integrated driving board that drives a display and a touch member together. However, the disclosure is not necessarily limited thereto, and a separate display drive substrate and a separate touch drive substrate may be attached to the sub-region SR of the display panel 10.

Figure 3:
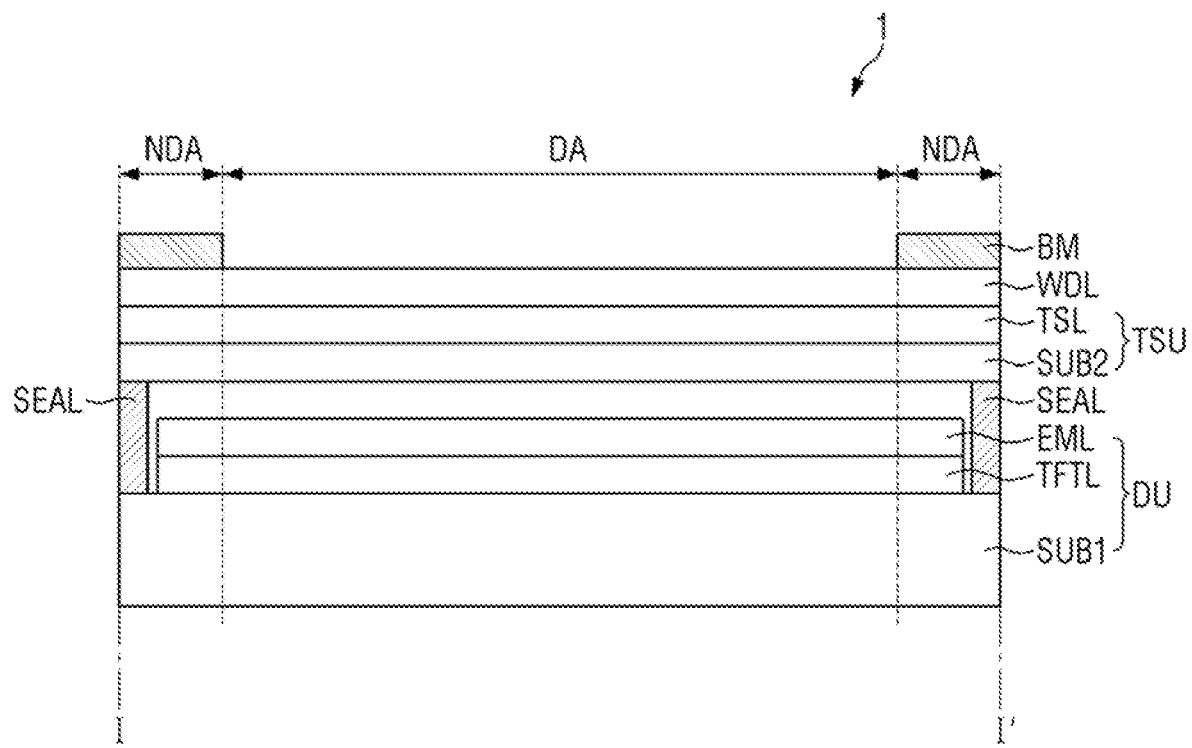
FIG. 3 is a cross-sectional view illustrating an example of line I-I' of FIG. 1.

FIG. 3 is a cross-sectional view illustrating an example of line I-I' of FIG. 1.

Referring to FIG. 3, the display device 1 may include a display unit DU and a touch sensing unit TSU. The display device 1 may further include an adhesive member SEAL that bonds the display unit DU and the touch sensing unit TSU, a window WDL disposed on the touch sensing unit TSU, and a light blocking member BM disposed on the window WDL.

The display unit DU may include a first substrate SUB1, a thin film transistor layer TFTL disposed on the first substrate SUB1, and a light emitting element layer EML.

The first substrate SUB1 may be a rigid substrate or a flexible substrate that may be bent, folded, and rolled. The first substrate SUB1 may be made of an insulating material such as glass, quartz, and a polymer resin.

The thin film transistor layer TFTL disposed on the first substrate SUB1 may include a plurality of thin film transistors and a plurality of display signal lines for driving pixels. The plurality of display signal lines may include a scan line through which a scan signal is transmitted to each pixel and a data line through which a data signal is transmitted.

The light emitting element layer EML disposed on one surface of the thin film transistor layer TFTL may include light emitting elements that emit light. Each of the light emitting elements may emit light having a predetermined luminance according to an anode voltage and a cathode voltage applied from the thin film transistor layer TFTL.

Each of the light emitting elements may be an organic light emitting diode including an anode electrode, a cathode electrode, and an organic light emitting layer disposed between the anode electrode and the cathode electrode. Alternatively, each of the light emitting elements may be an inorganic light emitting element including an anode electrode, a cathode electrode, and an inorganic semiconductor disposed between the anode electrode and the cathode electrode. Alternatively, each of the light emitting elements may be a quantum dot light emitting device including an anode electrode, a cathode electrode, and a quantum dot light emitting layer disposed between the anode electrode and the cathode electrode. Alternatively, each of the light emitting elements may be a micro light emitting diode.

The touch sensing unit TSU may include a second substrate SUB2 and a touch sensing layer TSL. The touch sensing unit TSU may be a touch member for sensing a touch of a user.

The second substrate SUB2 may be a rigid substrate or a flexible substrate that may be bent, folded, and/or rolled to at least a noticeable extent without cracking or otherwise sustaining damage. The second substrate SUB2 may be made of an insulating material such as glass, quartz, and a polymer resin. The second substrate SUB2 may serve as an encapsulation substrate that prevents moisture and oxygen from penetrating into the light emitting element layer EML from the outside.

The touch sensing layer TSL may be disposed on the second substrate SUB2. The touch sensing layer TSL may include electrodes ("IE1" and "IE2" in FIG. 4) for sensing a touch of the user in a capacitive manner, touch pads, and signal wires connecting the touch pads and the electrodes. For example, the touch sensing layer TSL may sense a touch of the user using a self-capacitance method or a mutual capacitance method.

In some embodiments of the disclosure, electrodes of the touch sensing layer TSL may be arranged in the touch sensing area TSA overlapping the display area DA. The touch pads and the signal wires of the touch sensing layer TSL may be arranged in a touch peripheral area TPA overlapping the non-display area NDA.

The adhesive member SEAL may bond the first substrate SUB1 of the display unit DU and the second substrate SUB2 of the touch sensing unit TSU. The adhesive member SEAL may be made of a frit adhesive layer, an ultraviolet curable resin, or a thermosetting resin, but the disclosure is not necessarily limited thereto.

FIG. 3 illustrates a state in which a space between the light emitting element layer EML and the second substrate SUB2 is empty, but the embodiments of the disclosure are not necessarily limited thereto. For example, a filling film may be disposed between the light emitting element layer EML and the second substrate SUB2. The filling film may be an epoxy filled film or a silicone filled film.

The window WDL may be disposed on the touch sensing unit TSU. The window WDL may include a rigid material such as glass or quartz. The window WDL may include, for example, a window member. The window WDL may be attached onto the touch sensing layer TSL by an optically transparent adhesive or the like.

The light blocking member BM for minimizing visibility of external light may be printed on one surface of the window WDL. FIG. 3 illustrates a state in which the light blocking member BM is disposed on the upper surface of the window WDL, but the embodiments of the specification are not necessarily limited thereto. For example, the light blocking member BM may be disposed on the lower surface of the window WDL. The light blocking member BM may be disposed in the non-display area NDA of the display device 1 to prevent the plurality of driving circuits and the plurality of signal wires arranged in the non-display area NDA or the touch peripheral area TPA from being visually recognized.

A polarizing film for reducing reflection of external light may be additionally disposed between the touch sensing layer TSL and the window WDL.

Figure 4:
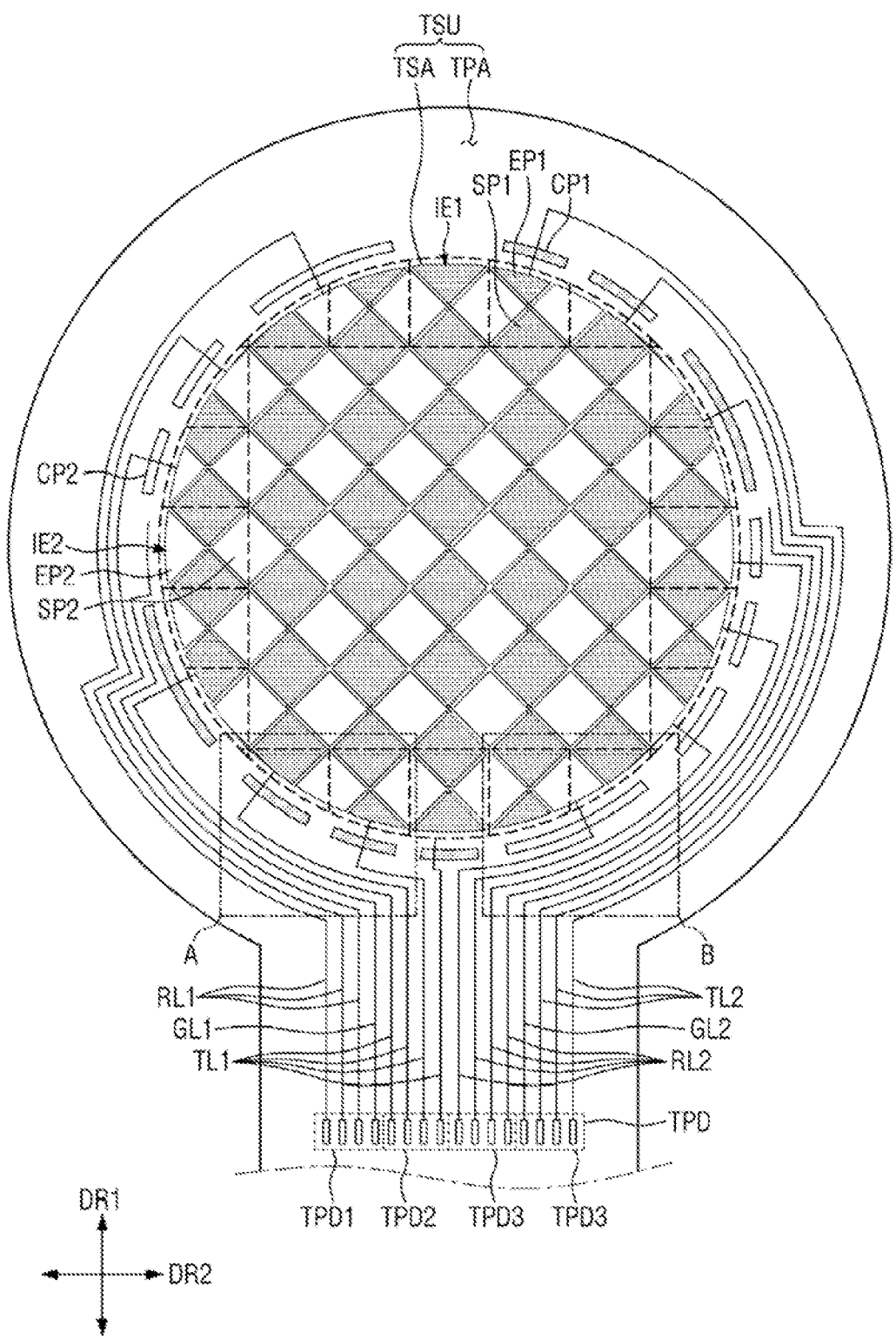
FIGS. 4 and 5 are schematic plan views of a layout of a touch sensing unit according to an embodiment of the disclosure.
Figure 5:
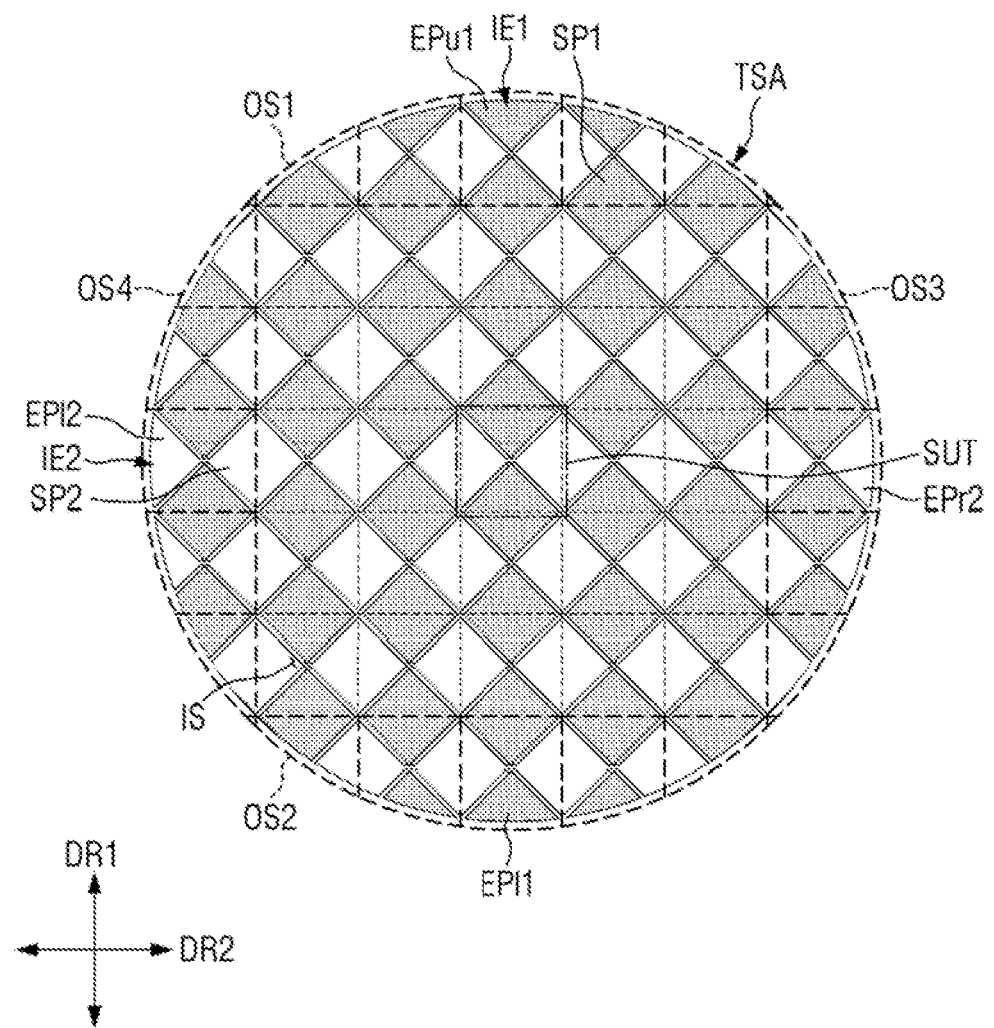

FIGS. 4 and 5 are schematic plan views of a layout of a touch sensing unit according to one embodiment of the disclosure.

Referring to FIGS. 4 and 5, the touch sensing unit TSU may include the touch sensing area TSA that senses a touch of the user and the touch peripheral area TPA disposed in the periphery of the touch sensing area TSA.

Further, the touch sensing area TSA may include an inner part IS and outer parts (OS: OS1, OS2, OS3, and OS4).

When the touch sensing area TSA has a circular shape in a plan view, the inner part IS may have the largest quadrilateral shape that may be formed in the circular shape of the touch sensing area TSA. For example, the inner part IS may have a quadrilateral shape in a plan view, and four vertices of the inner part IS may be located along edges of the touch sensing area TSA. The length of a diagonal line connecting opposite vertices of the inner part IS may be substantially the same as the length of a diameter of the circular shape of the touch sensing area TSA. Further, a central point at which the two diagonal lines of the inner part IS intersect each other may be substantially the same as a central point of the touch sensing area TSA.

The outer parts OS may include a first outer part OS1 disposed on one side of the inner part IS in the first direction DR1, a second outer part OS2 disposed on the other side of the inner part IS in the first direction DR1, a third outer part OS3 disposed on one side of the inner part IS in the second direction DR2, and a fourth outer part OS4 disposed on the other side of the inner part IS in the second direction DR2. At least one side of each of the outer parts OS1, OS2, OS3, and OS3 may have a part of the circular shape.

The outer parts OS1, OS2, OS3, and OS4 may surround the inner part IS. The outer parts OS1, OS2, OS3, and OS4 may be arranged at the edges of the touch sensing area TSA. The first outer part OS1 may be disposed on the upper side of the inner part IS, the second outer part OS2 may be disposed on the lower side of the inner part IS, the third outer part OS3 may be disposed on the right side of the inner part IS, and the fourth outer part OS4 may be disposed on the left side of the inner part IS.

The touch sensing area TSA may include the plurality of first electrodes IE1 and the plurality of second electrodes IE2. One of the first electrode IE1 and the second electrode IE2 may be a driving electrode and the other one thereof may be a sensing electrode. In the embodiment, it is exemplified that the first electrode IE1 is the driving electrode and the second electrode IE2 is the sensing electrode.

The plurality of first electrodes IE1 may each extend in the first direction DR1 and may be spaced apart from each other in the second direction DR2. Each of the plurality of first electrodes IE1 may include a plurality of first main patterns SP1, a plurality of first outer patterns EP1, and a plurality of first connection patterns ("BP1" in FIG. 8). Each of the first electrodes IE1 may have a shape in which the plurality of first main patterns SP1 and the plurality of first outer patterns EP1 are connected.

The plurality of first main patterns SP1 may be arranged in the first direction DR1. The plurality of first main patterns SP1 may be arranged in the inner part IS of the touch sensing area TSA. The first main pattern SP1 may have a rhombus shape, but the disclosure is not necessarily limited thereto. The first main pattern SP1 has a first area.

Each of the plurality of first outer patterns EP1 may be located at opposite ends in an extension direction. For example, the first outer pattern EP1 may be disposed at one end or the other end of the first main pattern SP1 extending in the first direction DR1. The first outer pattern EP1 may be disposed in the outer part OS of the touch sensing area TSA. For example, the first outer pattern EP1 may be disposed at the edge of the touch sensing area TSA.

Since the first outer pattern EP1 is disposed at the edge of the touch sensing area TSA, at least one side of the first outer pattern EP1 may include substantially the same shape as the shape of the edge of the touch sensing area TSA. For example, the at least one side of the first outer pattern EP1 may include the same shape as the edge of the touch sensing area TSA, and the other sides thereof may include substantially the same rhombus shape as the first main pattern SP1. Therefore, the first outer pattern EP1 may have an irregular shape in which a portion is cut from the rhombus shape. The first outer pattern EP1 has a second area that is smaller than the first area of the first main pattern SP1.

Referring to FIG. 5, the plurality of first outer patterns EP1 may include a first one-side outer pattern EPu1 disposed on one side (for example, an upper side) of the first electrode IE1 in the first direction DR1 and a first other-side outer pattern EP11 disposed on the other side (for example, a lower side) of the first electrode IE1 in the first direction DR1.

In the embodiment, the first one-side outer pattern EPu1 may be disposed in the first outer part OS1 of the touch sensing area TSA and connected to the first main pattern SP1. The first other-side outer pattern EP11 may be disposed in the second outer part OS2 of the touch sensing area TSA and connected to the first main pattern SP1.

The first connection patterns (BP1: BP1-1 and BP1-2) may be arranged between two adjacent first main patterns SP1 in the first direction DR1 and may connect the two first main patterns SP1. Further, the first connection pattern BP1 may be disposed between the first main pattern SP1 and the first outer pattern EP1 adjacent to each other in the first direction DR1 and connect the first main pattern SP1 and the first outer pattern EP1.

In the embodiment, in the first main pattern SP1 disposed at a boundary between the first outer part OS1 and the inner part IS among the plurality of first main patterns SP1, a half (for example, a half of the rhombus shape) of the first main pattern SP1 may be disposed in the inner part IS, and the other half (for example, a half of the rhombus shape) of the first main pattern SP1 may be disposed in the first outer part OS1. Further, in the first outer pattern EP1 disposed at the boundary between the first outer part OS1 and the inner part IS among the plurality of first outer patterns EP1, a part of the first outer pattern EP1 may be disposed in the first outer part OS1, and the other part thereof (for example, a half of the rhombus shape) may be disposed in the inner part IS. This may be equally applied to a boundary between the second outer part OS2 and the inner part IS.

The plurality of second electrodes IE2 may each extend in the second direction DR2 and may be spaced apart from each other in the first direction DR1. Each of the plurality of first electrodes TE1 may include a plurality of second main patterns SP2, a plurality of second outer patterns EP2, and a plurality of second connection patterns ("BP2" in FIG. 8). Each of the second electrodes IE2 may have a shape in which the plurality of second main patterns SP2 and the plurality of second outer patterns EP2 are connected.

The plurality second main patterns SP2 may be arranged in the second direction DR2. The plurality of second main patterns SP2 may be arranged in the inner part IS of the touch sensing area TSA.

In the embodiment, the second main pattern SP2 may have substantially the same shape as the first main pattern SP1. For example, the second main pattern SP2 may have a rhombus shape, but the disclosure is not necessarily limited thereto. The second main pattern SP2 has a first area.

Each of the plurality of second outer patterns EP2 may be located at opposite ends in an extension direction. For example, the second outer pattern EP2 may be disposed at one end or the other end of the second main pattern SP2 extending in the second direction DR2. The second outer pattern EP2 may be disposed in the outer part OS of the touch sensing area TSA. For example, the second outer pattern EP2 may be disposed at the edge of the touch sensing area TSA.

Since the second outer pattern EP2 is disposed at the edge of the touch sensing area TSA, at least one surface of the second outer pattern EP2 may include substantially the same shape as the shape of the edge of the touch sensing area TSA. For example, the at least one surface of the second outer pattern EP2 may include the same shape as the edge of the touch sensing area TSA, and the other surfaces thereof may include substantially the same rhombus shape as the second main pattern SP2. The second outer pattern EP2 may have a figure shape that is cut from the rhombus shape. The second outer pattern EP2 has a second area that is smaller than the first area of the second main pattern SP2.

Referring to FIG. 5, the plurality of second outer patterns EP2 may include a second one-side outer pattern EPr2 disposed on one side (for example, a right side) of the second electrode IE2 in the second direction DR2 and a second other-side outer pattern EP12 disposed on the other side (for example, a left side) of the second electrode IE2 in the second direction DR2.

In the embodiment, the second one-side outer pattern EPr2 may be disposed in the third outer part OS3 of the touch sensing area TSA and connected to the second main pattern SP2. The second other-side outer pattern EP12 may be disposed in the fourth outer part OS4 of the touch sensing area TSA and connected to the second main pattern SP2.

The second connection pattern BP2 may be arranged between two adjacent second main patterns SP2 in the second direction DR2 and may connect the two second main patterns SP2. Further, the second connection pattern BP2 may be disposed between the second main pattern SP2 and the second outer pattern EP2 adjacent to each other in the second direction DR2 and connect the second main pattern SP2 and the second outer pattern EP2.

In the embodiment, in the second main pattern SP2 disposed at a boundary between the third outer part OS3 and the inner part IS among the plurality of second main patterns SP2, a half (for example, a half of the rhombus shape) of the second main pattern SP2 may be disposed in the inner part IS, and the other half (for example, a half of the rhombus shape) of the second main pattern SP2 may be disposed in the third outer part OS3. Further, in the second outer pattern EP2 disposed at the boundary between the third outer part OS3 and the inner part IS among the plurality of second outer patterns EP2, a part of the second outer pattern EP2 may be disposed in the third outer part OS3, and the other part thereof (for example, a half of the rhombus shape) may be disposed in the inner part IS. This may be equally applied to a boundary between the fourth outer part OS4 and the inner part IS.

Although the drawings illustrate that seven first electrodes TE1 and seven second electrodes IE2 are arranged, the numbers of the first electrodes IE1 and the second electrodes IE2 are not necessarily limited to the above example.

Figure 6:
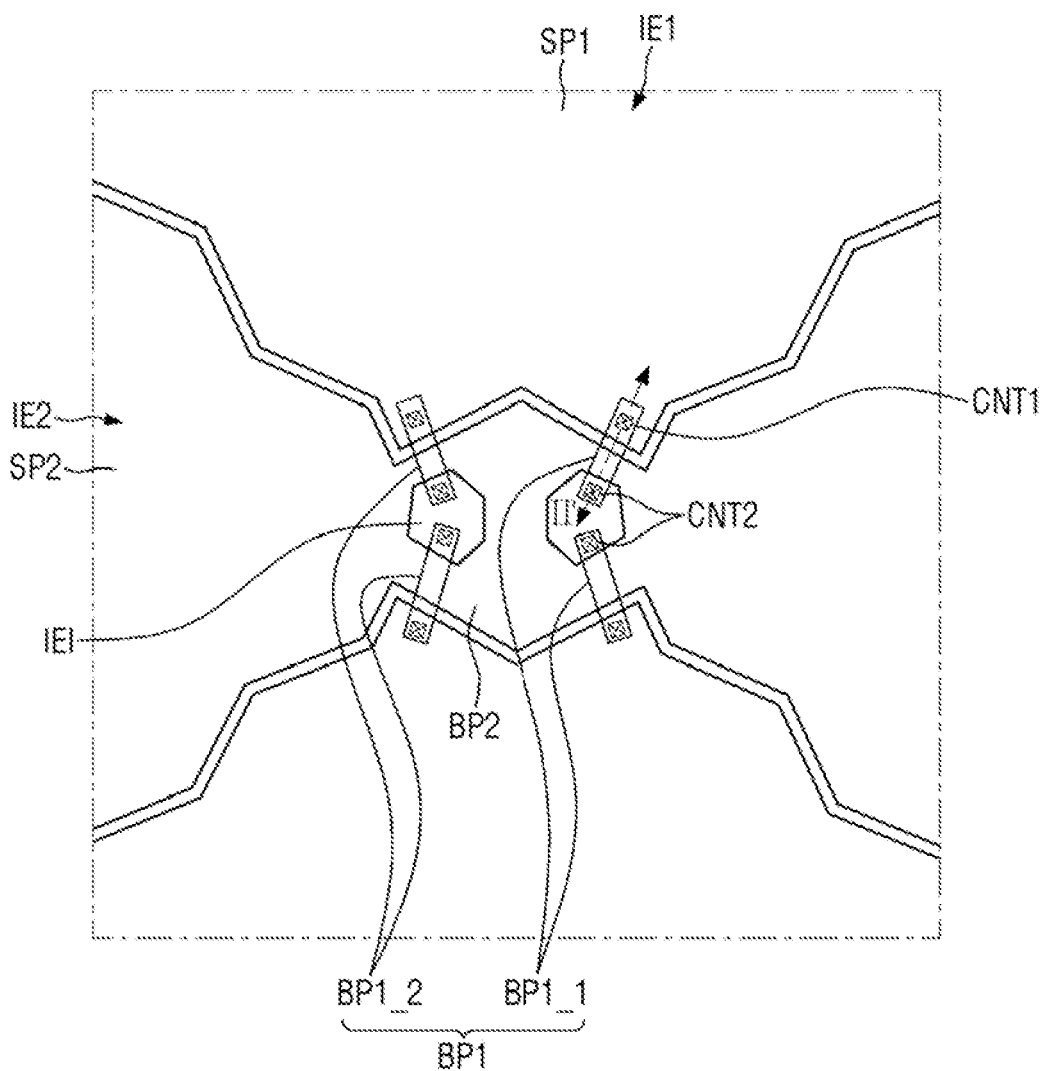
FIG. 6 is a partially enlarged view of a touch sensing area of FIG. 5.

FIG. 6 is a partially enlarged view of a touch sensing area of FIG. 5.

Referring to FIGS. 5 and 6, the first main pattern SP1 and the second main pattern SP2 may have a rhombus shape.

In the specification, it is interpreted that the term "rhombus shape" or "substantial rhombus shape" includes a substantial rhombus shape in which, even when curves or irregularities are in at least a partial section of each line segment, line segments connected in the overall extending direction form the rhombus shape as well as a rhombus shape in which line segments constituting the rhombus shape extend in predetermined directions, the four line segments have completely linear shapes, and the line segments extending in the predetermined direction form the rhombus shape.

For example, at least some sections of the line segments constituting the rhombus shape of the first main pattern SP1 and the second main pattern SP2 may include irregularities. By including the irregularities, when an image of the display device 1 is viewed, a moire phenomenon can be prevented from occurring due to the first main pattern SP1 and the second main pattern SP2. Meanwhile, the planar shapes of the first main pattern SP1 and the second main pattern SP2 are not necessarily limited to those illustrated in FIG. 6. The irregularities having a rhombus shape may be equally applied even to the first outer pattern EP1 and the second outer pattern EP2.

The first connection pattern BP1 may connect edge parts of the rhombus shape of the adjacent first main patterns SP1. The second connection pattern BP2 may connect edge parts of the rhombus shape of the adjacent second main patterns SP2. The width of each of the first connection pattern BP1 and the second connection pattern BP2 may be smaller than the width of each of the first main pattern SP1 and the second main pattern SP2.

The first electrode TE1 and the second electrode IE2 may be insulated from each other and may intersect each other. The insulation between the first electrode IE1 and the second electrode IE2 can be secured as the first electrode TE1 and the second electrode IE2 are connected through conductive layers located in different layers in the region in which the first electrode IE1 and the second electrode IE2 intersect each other. Insulation properties thereof can be secured using an insulating layer interposed between the plurality of conductive layers. A stack structure of the touch sensing unit TSU will be described with reference to FIG. 7.

In the inner part IS of the touch sensing area TSA, the first main patterns SP1 and the second main patterns SP2 adjacent to each other may constitute a unit sensing area SUT. For example, with respect to the region in which the first electrode IE1 and the second electrode IE2 intersect each other, a half of the two adjacent first main patterns SP1 and a half of the two adjacent second main patterns SP2 may constitute a single square or rectangle. In this way, an area defined by a half area of the two adjacent first main patterns SP1 and the two adjacent second main patterns SP2 may be one unit sensing area SUT.

The planar shape of the unit sensing area SUT located in the outer part OS of the touch sensing area TSA may be different from the planar shape of the unit sensing area SUT located in the inner part IS. In detail, the unit sensing area SUT located in the outer part OS may include a shape cut according to the shape of the outer part OS.

As described above, the second area of each of the first outer pattern EP1 and the second outer pattern EP2 may be smaller than the first area of each of the first main pattern SP1 and the second main pattern SP2. In this case, the unit sensing area SUT located in the outer part OS includes at least one of the first outer pattern EP1 and the second outer pattern EP2 and thus may have a smaller area than the unit sensing area SUT located in the inner part IS.

For example, in the first outer part OS1 and the second outer part OS2, the unit sensing area SUT may include a half of the one first main pattern SP1, the one whole first outer pattern EP1, and a half of the two second main patterns SP2, which are adjacent to the region in which the first electrode IE1 and the second electrode IE2 intersect each other. As an example, the unit sensing area SUT may include a half of the one first main pattern SP1, the one whole first outer pattern EP1, a half of the one second main pattern SP2, and a part of the one second outer pattern EP2, which are adjacent to the region in which the first electrode IE1 and the second electrode IE2 intersect each other. As an example, the unit sensing area SUT may include a part of the one first outer pattern EP1 and a part of the one second outer pattern EP2, which are adjacent to the region in which the first electrode IE1 and the second electrode IE2 intersect each other.

Further, in the third outer part OS3 and the fourth outer part OS4, the unit sensing area SUT may include a half of the one second main pattern SP2, the one whole second outer pattern EP2, and a half of the two first main patterns SP1, which are adjacent to the region in which the first electrode IE1 and the second electrode IE2 intersect each other. As an example, the unit sensing area SUT may include a half of the one first main pattern SP1, a part of the one first outer pattern EP1, a half of the one second main pattern SP2, and the one whole second outer pattern EP2, which are adjacent to the region in which the first electrode IE1 and the second electrode IE2 intersect each other. As an example, the unit sensing area SUT may include a part of the one first outer pattern EP1 and a part of the one second outer pattern EP2, which are adjacent to the region in which the first electrode IE1 and the second electrode IE2 intersect each other.

A plurality of unit sensing areas SUT may be arranged in a matrix. For example, the plurality of unit sensing areas SUT may be arranged in the first direction DR1 or the second direction DR2.

In the unit sensing area SUT located in the inner part IS, by measuring a capacitance value ("Cm1" in FIG. 11) between the first main pattern SP1 and the second main pattern SP2 adjacent to each other, whether a touch is input may be determined, and the corresponding location may be calculated as touch input coordinates.

Each unit sensing area SUT may be larger than the pixel. For example, the unit sensing areas SUT may correspond to the plurality of pixels. The length of one side of the unit sensing area SUT may be in the range of 4 mm to 5 mm, but the disclosure is not necessarily limited thereto.

In comparative examples, the unit sensing area SUT located in the outer part OS, whether a touch is input may be determined by measuring a capacitance value between the first main pattern SP1 and the second outer pattern EP2 adjacent to each other, a capacitance value between the second main pattern SP2 and the first outer pattern EP1 adjacent to each other, and a capacitance value between the first outer pattern EP1 and the second outer pattern EP2 adjacent to each other.

In this case, since the area of the unit sensing area SUT located in the outer part OS is smaller than the area of the unit sensing area SUT located in the inner part IS, the measured capacitance value may be small. Accordingly, the touch sensitivity of the touch sensing unit TSU may be reduced.

In the embodiment, to increase the touch sensitivity of the outer part OS of the touch sensing area TSA, the touch sensing unit TSU may further include a plurality of compensation patterns CP1 and CP2 connected to the first outer pattern EP1 and the second outer pattern EP2 arranged in the outer part OS of the touch sensing area TSA. For example, the first outer pattern EP1 may be connected to the first compensation pattern CP1, and the second outer pattern EP2 may be connected to the second compensation pattern CP2.

The area of the first outer pattern EP1 and the second outer pattern EP2 in the unit sensing area SUT of the outer part OS may be increased due to the plurality of compensation patterns CP1 and CP2 connected to the first outer pattern EP1 and the second outer pattern EP2. Due to an increase in the area of the first outer pattern EP1 and the second outer pattern EP2, a difference between areas of the first outer pattern EP1 and the first main pattern SP1 may be reduced. Further, a difference between areas of the second outer pattern EP2 and the second main pattern SP2 may be reduced.

Therefore, a difference between a capacitance between the first electrode IE1 and the second electrode IE2 of the unit sensing area SUT of the outer part OS and a capacitance between the first electrode TE1 and the second electrode IE2 of the unit sensing area SUT of the inner part IS may be reduced. Thus, the uniformity of touch sensitivity can be increased.

More details on the compensation pattern will be described with reference to FIGS. 8 to 12.

Referring back to FIG. 4, the plurality of signal wires may be arranged in the touch peripheral area TPA. The plurality of signal wires may extend from a touch pad part TPD to one side in the first direction DR1. The plurality of signal wires may include a plurality of driving wires TL and a plurality of sensing wires. The plurality of signal wires may further include guard wires GL1 and GL2 and/or a ground wire.

Figure 8:
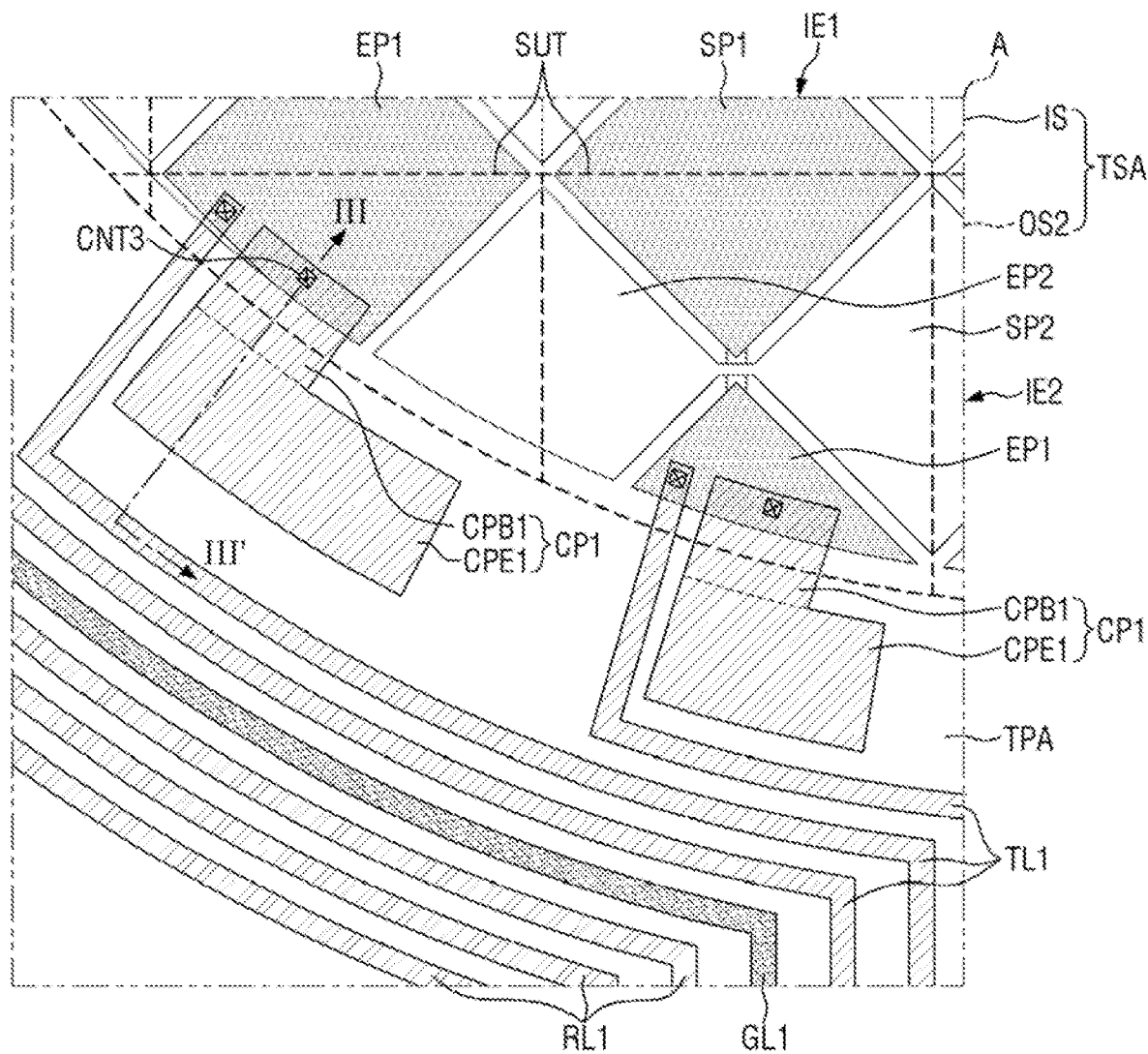
FIG. 8 is an enlarged plan view illustrating an example of region A of FIG. 4.

Each of the plurality of driving wires (TL: TL1 and TL2) may be connected to at least one of the first electrode IE1 and the first compensation pattern CP1. In the embodiment, the first electrode IE1 may be connected to the driving wire TL corresponding thereto. In an embodiment of the disclosure, the first compensation pattern CP1 may be connected to the driving wire TL corresponding thereto. In an embodiment of the disclosure, the driving wire TL may be connected to the first electrode IE1 and the first compensation pattern CP1. Hereinafter, as illustrated in FIG. 8, it is exemplified that the driving wire TL is connected to the first electrode IE1. An embodiment of the disclosure will be described with reference to FIGS. 11 and 12.

For example, the plurality of driving wires TL may include a first driving wire TL1 connected to a lower end (for example, the first other-side outer pattern EP11) of the first electrode IE1 and a second driving wire TL2 connected to an upper end (for example, the first one-side outer pattern EPu1) of the first electrode TEL The first driving wire TL1 may extend from a second touch pad part TPD2 among the plurality of touch pad parts TPD to one side in the first direction DR1 and may be connected to the lower end of the first electrode IE1. The second driving wire TL2 may extend from a fourth touch pad part TPD4 among the plurality of touch pad parts TPD to one side in the first direction DR1 and may be connected to the upper end of the first electrode IE1 by bypassing a right edge of the touch sensing area TSA.

In the embodiment, it is exemplified that each of the plurality of driving wires TL are vertically divided and connected, but the disclosure is not necessarily limited thereto. For example, each of the plurality of driving wires TL may be connected to only the lower end of the first electrode IE1 or may be simultaneously connected to the upper and lower ends of the first electrode IE1.

Figure 10:
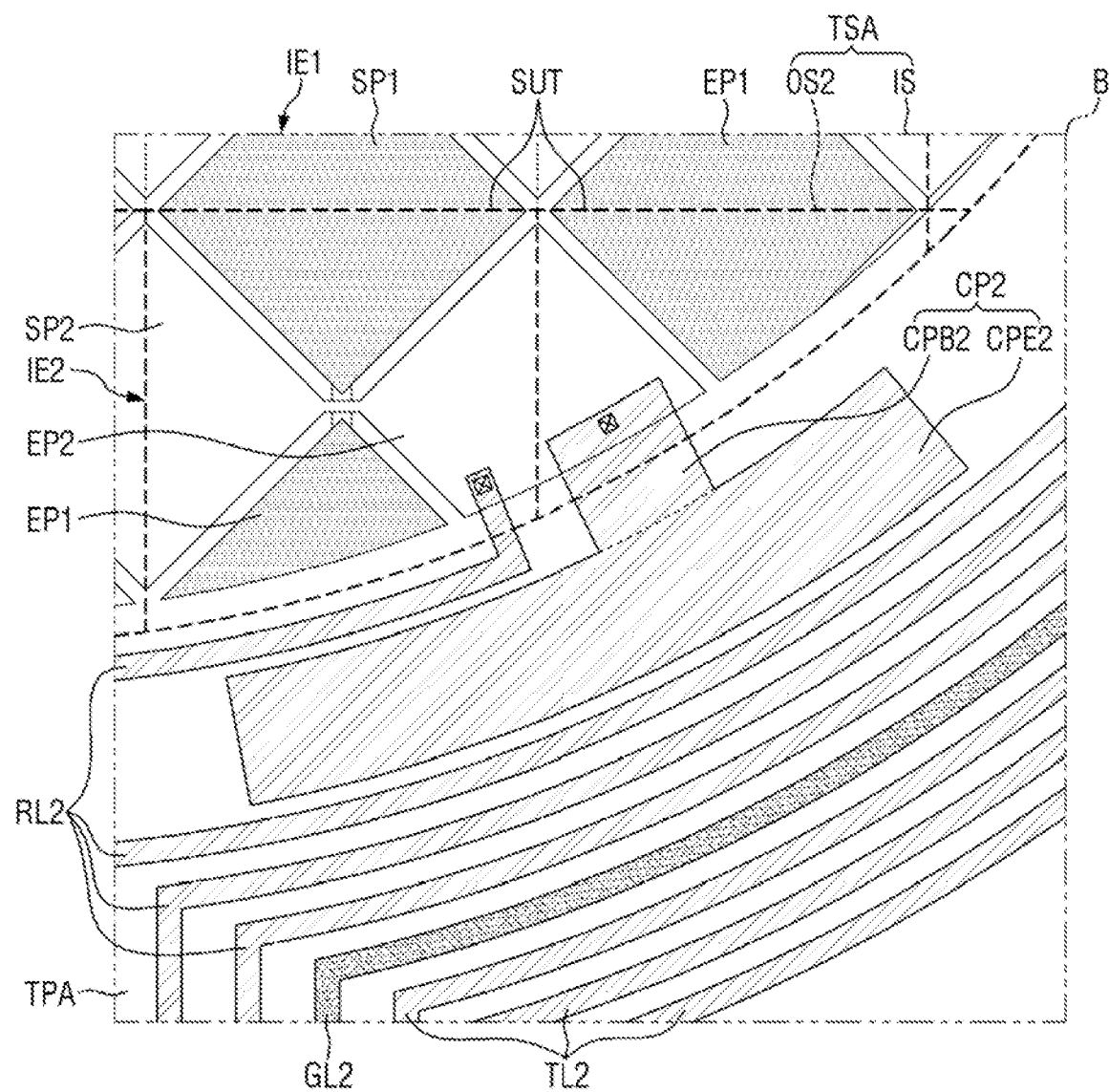
FIG. 10 is an enlarged plan view illustrating an example of region B of FIG. 4.

Similar to the plurality of driving wires TL, each of the plurality of sensing wires (RL: RL1 and RL2) may be connected to at least one of the second electrode IE2 and the second compensation pattern CP2. In the embodiment, the first electrode IE1 may be connected to the sensing wire RL corresponding thereto. In an embodiment of the disclosure, the first compensation pattern CP1 may be connected to the sensing wire RL corresponding thereto. In an embodiment of the disclosure, the sensing wire RL may be connected to the first electrode IE1 and the first compensation pattern CP1. Hereinafter, as illustrated in FIG. 10, it is exemplified that the sensing wire RL is connected to the second electrode IE2.

For example, the plurality of sensing wires RL may include a first sensing wire RL1 that extends from a first touch pad part TPD among the plurality of touch pad parts TPD and is connected to a left end (for example, the second other-side outer pattern EP12) of the second electrode IE2 and a second sensing wire RL2 that extends from a third touch pad part TPD3 and is connected to a right end (for example, the second one-side outer pattern EPr2) of the second electrode IE2.

In the embodiment, it is exemplified that the plurality of sensing wires RL are horizontally divided and connected, but the disclosure is not necessarily limited thereto. For example, each of the plurality of sensing wires RL may be connected to only the lower end of the second electrode IE2 or may be connected to only the right end of the second electrode IE2.

The guard wires GL1 and GL2 may be arranged between the plurality of driving wires TL and the plurality of sensing wires RL. The guard wires GL1 and GL2 may prevent coupling between the driving wires TL and the sensing wires RL. The guard wires GL1 and Gl2 may surround the touch sensing area TSA and the signal wires.

The guard wires GL1 and GL2 may include a first guard wire GL1 disposed between the first driving wire TL1 and the first sensing wire RL1 and a second guard wire GL2 disposed between the second driving wire TL2 and the second sensing wire RL2.

The first guard wire GL1 may extend from the first touch pad part TPD1 and extend along a left edge of the touch sensing area TSA. The first guard wire GL1 may minimize a coupling phenomenon affected by a change in voltage between the first driving wire TL1 and the first sensing wire RL1.

The second guard wire GL2 may extend from the fourth touch pad part TPD4 and extend along the right edge of the touch sensing area TSA. The second guard wire GL2 may minimize a coupling phenomenon affected by a change in voltage between the second driving wire TL2 and the second sensing wire RL2.

The first outer pattern EP1, the first compensation pattern CP1, the first driving wire TL1, the first guard wire GL1, and the first sensing wire RL1 may be sequentially arranged, and the second outer pattern EP2, the second compensation pattern CP2, the second sensing wire RL2, the second guard wire GL2, and the second driving wire TL2 may be sequentially arranged.

A ground wire may be further disposed between the signal wires.

The plurality of touch pad parts TPD may include, from the left side to the right side, the first touch pad part TPD1, the second touch pad part TPD2, the third touch pad part TPD3, and the fourth touch pad part TPD4. Each of the touch pad parts TPD may include a plurality of touch pads. Each of the touch pads may be connected to a corresponding one of the plurality of signal wires.

For example, the first touch pad part TPD1 may be connected to the first sensing wire RL1 and the first guard wire GL1, the second touch pad part TPD2 may be connected to the first driving wire TL1, the third touch pad part TPD3 may be connected to the second sensing wire RL2, and the fourth touch pad part TPD4 may be connected to the second driving wire TL2 and the second guard wire GL2.

Figure 7:
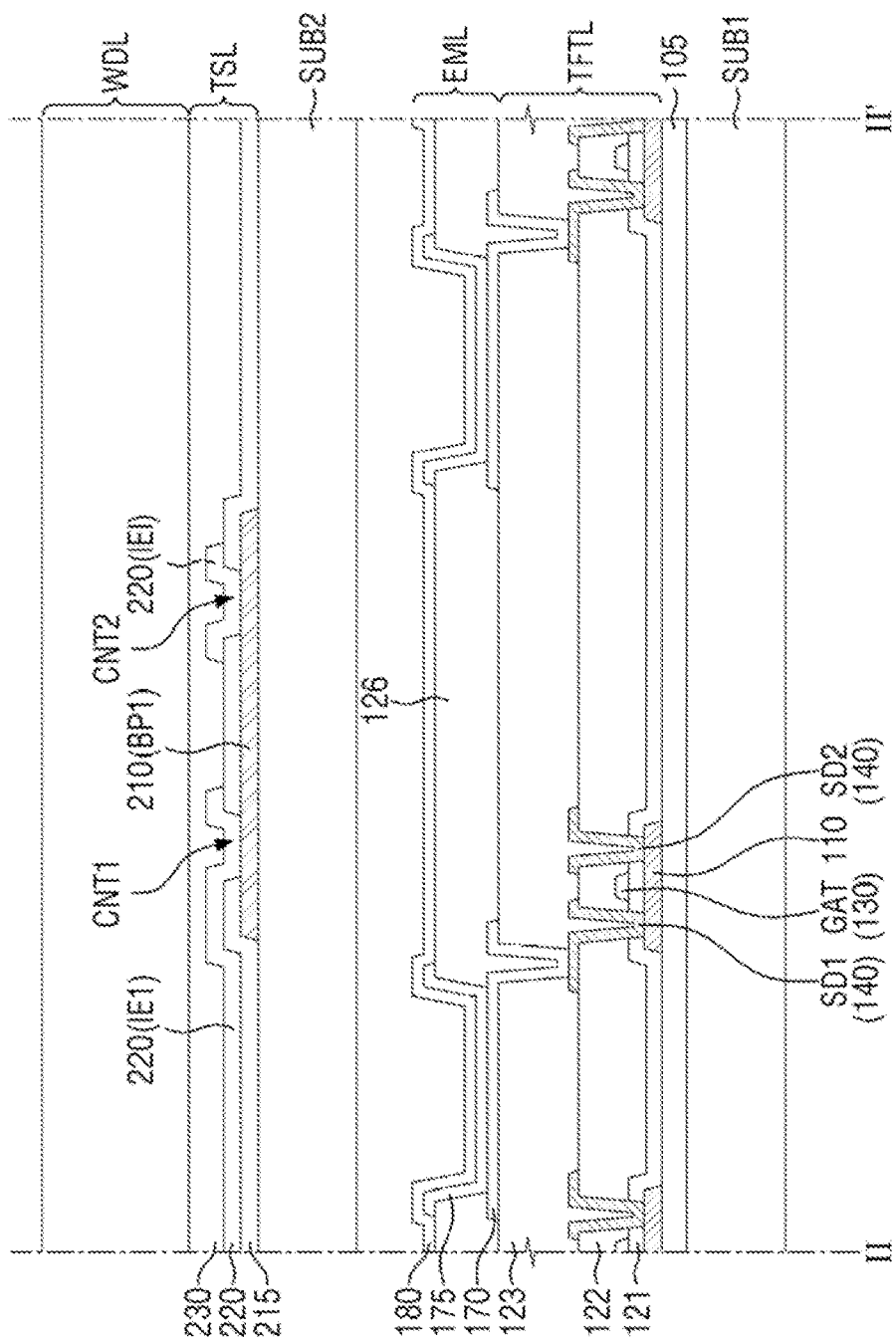
FIG. 7 is a cross-sectional view taken along line II-II' of FIG. 6.

FIG. 7 is a cross-sectional view taken along line II-II' of FIG. 6.

Referring to FIG. 7, a buffer layer 105 is disposed on the first substrate SUB1. The buffer layer 105 may include silicon nitride, silicon oxide, silicon oxynitride, or the like.

A semiconductor layer 110 is disposed on the buffer layer 105. The semiconductor layer 110 forms a channel of the thin film transistor of the pixel.

A first insulating layer 121 is disposed on the semiconductor layer 110. The first insulating layer 121 may be a gate insulating film having a gate insulating function.

A first conductive layer 130 is disposed on the first insulating layer 121. The first conductive layer 130 may include a gate electrode GAT of the thin film transistor of the pixel.

A second insulating layer 122 may be disposed on the first conductive layer 130. The second insulating layer 122 may be an interlayer insulating film.

A second conductive layer 140 is disposed on the second insulating layer 122.

The second conductive layer 140 may include a first electrode SD1 and a second electrode SD2 of the thin film transistor of the pixel. The first electrode SD1 and the second electrode SD2 of the thin film transistor may be connected to a source region and a drain region of the semiconductor layer 110 through a contact hole passing through the second insulating layer 122 and the first insulating layer 121.

A third insulating layer 123 is disposed on the second conductive layer 140. The third insulating layer 123 covers the second conductive layer 140. The third insulating layer 120 may be a via layer. The third insulating layer 123 may include an organic insulating layer, and in this case, an upper surface of the third insulating layer 123 may be substantially flat (e.g., planarizing) regardless of a stepped part thereunder.

An anode electrode 170 is disposed on the third insulating layer 123. The anode electrode 170 may be a pixel electrode provided in each pixel. The anode electrode 170 may be connected to a source electrode or a drain electrode of the thin film transistor through a contact hole passing through the third insulating layer 123.

In a top emission structure that emits light toward a cathode electrode 180 with respect to an organic light emitting layer 175, the anode electrode 170 may be formed of a metal material having high reflectivity, such as a laminated structure (Ti/Al/Ti) of aluminum and titanium, a laminated structure (ITO/Al/ITO) of aluminum and indium tinoxide (ITO), an APC alloy, and a laminated structure (ITO/APC/ITO) of the APC alloy and ITO. The APC alloy is an alloy of silver (Ag), palladium (Pd), and copper (Cu).

In a bottom emission structure that emits light toward the anode electrode 170 with respect to the organic light emitting layer 175, the anode electrode 170 may be formed of a transparent metal oxide (TCO) such as ITO and indium zinc oxide (IZO) that may transmit light or a semi-transmissive conductive material such as magnesium (Mg), silver (Ag), or an alloy of magnesium (Mg) and silver (Ag).

A pixel defining film 126 may be disposed on the anode electrode 170. The pixel defining film 126 may include an opening disposed on the anode electrode 170 and exposing the anode electrode 170. The pixel defining film 126 may cover an edge of the anode electrode 170.

The light emitting layer 175 is disposed on the anode electrode 170 exposed by the pixel defining film 126. The light emitting layer 175 may include organic matter and may emit light of a predetermined wavelength. The light emitting layer 175 may further include a hole injection/transport layer or an electron injection/transport layer.

The cathode electrode 180 may be disposed on the light emitting layer 175. The cathode electrode 180 may be a common electrode disposed on the entire surface without distinction of pixels.

In the top emission structure, the cathode electrode 180 may be formed of a TCO such as ITO and IZO that may transmit light or a semi-transmissive conductive material such as magnesium (Mg), silver (Ag), or an alloy of magnesium (Mg) and silver (Ag).

In the bottom emission structure, the cathode electrode 190 may be formed of a metal material having high reflectivity, such as a laminated structure (Ti/Al/Ti) of aluminum and titanium, a laminated structure (ITO/Al/ITO) of aluminum and ITO, an APC alloy, and a laminated structure (ITO/APC/ITO) of the APC alloy and ITO. The APC alloy is an alloy of silver (Ag), palladium (Pd), and copper (Cu).

The anode electrode 170, the light emitting layer 175, and the cathode electrode 180 may constitute an organic light emitting device.

When the anode electrode 170 receives a first power supply voltage ELVDD through the thin film transistor of the thin film transistor layer TFTL and when the cathode electrode 180 receives a second power supply voltage ELVSS, holes and electrons may move to the light emitting layer 175 and may be combined with each other. The organic light emitting device may emit light according to a driving current corresponding to a data signal applied to the thin film transistor.

The second substrate SUB2 is disposed on the light emitting element layer EML, and the touch sensing layer TSL is formed on the second substrate SUB2.

The touch sensing layer TSL may include a first touch conductive layer 210, a first touch insulating layer 215, a second touch conductive layer 220, and a second touch insulating layer 230. In detail, the first touch conductive layer 210 is disposed on the second substrate SUB2. The first touch conductive layer 210 is covered with the first touch insulating layer 215. The first touch insulating layer 215 insulates the first touch conductive layer 210 and the second touch conductive layer 220 from each other. The second touch conductive layer 220 is disposed on the first touch insulating layer 215. The second touch insulating layer 230 may cover and protect the second touch conductive layer 220.

Referring to FIGS. 6 and 7, the first connection pattern BP1 may be formed using the first touch conductive layer 210. The first main pattern SP1, the second main pattern SP2, the second connection pattern BP2, and a first island electrode IEI may be formed using the first touch conductive layer 210 and the second touch conductive layer 220 with the first touch insulating layer 215 interposed therebetween. One end of each of the first connection patterns BP1 may be connected to the first main pattern SP1, and the other end thereof may be connected to the first island electrode IEI.

Through such a structure, mutual insulation may be secured at a portion in which the first electrode IE1 and the second electrode IE2 intersect each other. However, the disclosure is not necessarily limited thereto. The second connection pattern BP2 may be formed using the first touch conductive layer 210, and the first main pattern SP1, the first connection pattern BP1, the second main pattern SP2, and the first island electrode IEI may be formed using the second touch conductive layer 220.

Each of the first main pattern SP1 and the second main pattern SP2 may be formed as a planar pattern or a mesh-shaped pattern.

When the first main pattern SP1 and the second main pattern SP2 are formed as a mesh-shaped pattern, the first touch conductive layer 210 and the second touch conductive layer 220 may be formed of a low-resistance material such as aluminum (Al), molybdenum (Mo), gold (Au), titanium (Ti), nickel (Ni), and copper (Cu).

When the first main pattern SP1 and the second main pattern SP2 are formed as a planar pattern, even when the first touch conductive layer 210 is made of a low-resistance material such as aluminum (Al), molybdenum (Mo), gold (Au), titanium (Ti), nickel (Ni), and copper (Cu), the second touch conductive layer 220 constituting the first main pattern SP1 and the second main pattern SP2 may be formed using a transparent conductive layer. For example, a transparent conductive oxide such as ITO, IZO, zinc oxide (ZnO), and indium tin zinc oxide (ITZO), a conductive polymer such as poly(3,4-ethylenedioxythiophene) (PEDOT), metal nanowires, graphene, and the like may be applied to the transparent conductive layer.

Hereinafter, an example case in which each of the first main pattern SP1 and the second main pattern SP2 is formed as a planar pattern will be described. In this case, even when a part of the second touch conductive layer 220 overlaps the pixels, the aperture ratio of the pixels is not reduced.

The material forming the first outer pattern EP1 and the second outer pattern EP2 may be substantially the same as the material forming the first main pattern SP1 and the second main pattern SP2.

The first touch insulating layer 215 and the second touch insulating layer 230 may include an inorganic insulating material or an organic insulating material. In the embodiment, one of the first touch insulating layer 215 and the second touch insulating layer 230 may include an inorganic material, and the other one thereof may include an organic material.

The first touch insulating layer 215 may include a first contact hole CNT1 and a second contact hole CNT2. The first main pattern SP1 and the first connection pattern BP1 may be electrically connected through the first contact hole CNT1, and the first connection pattern BP1 and the first island electrode IEI may be electrically connected through the second contact hole CNT2. The plurality of first main patterns SP1 and the plurality of first outer patterns EP1, which are arranged in the first direction DR1, may be electrically connected.

The window WDL may be disposed on the touch sensing layer TSL. The first substrate SUB1 may include the touch sensing area TSA and the touch peripheral area TPA, and in the touch peripheral area TPA, the light blocking member BM may be further disposed on the window WDL.

Figure 9:
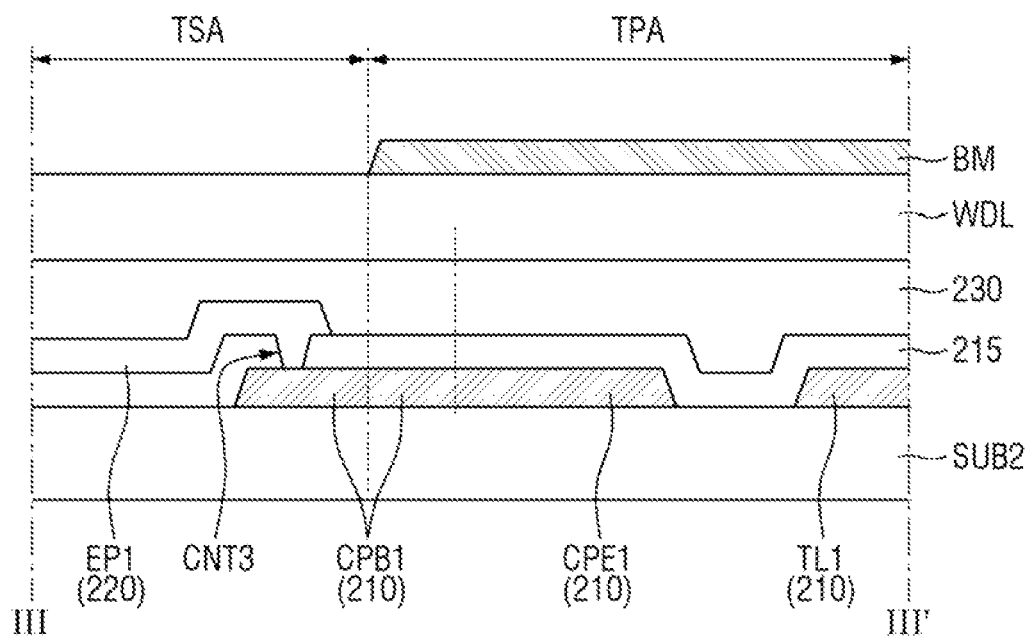
FIG. 9 is a cross-sectional view taken along line III-III' of FIG. 8.
Figure 11:
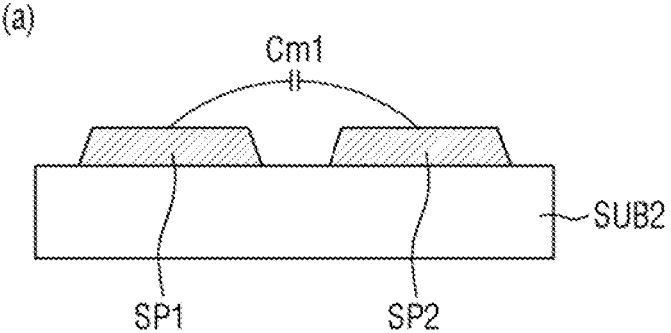
FIG. 11 shows schematic views illustrating a capacitance formed in the touch sensing unit according to an embodiment of the disclosure.
Figure 11:
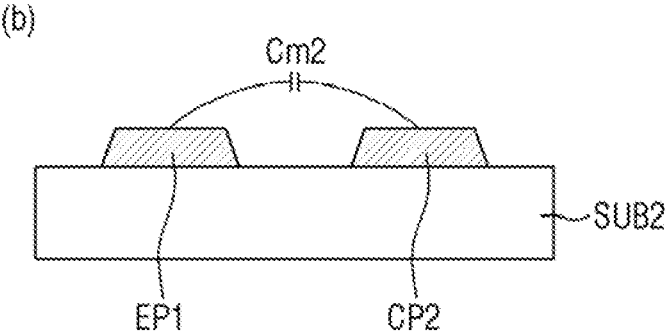
Figure 11:
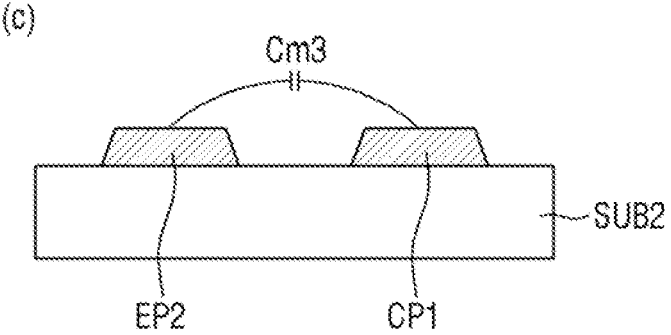

FIG. 8 is an enlarged plan view illustrating an example of region A of FIG. 4, FIG. 9 is a cross-sectional view taken along line III-III' of FIG. 8, FIG. 10 is an enlarged plan view illustrating an example of region B of FIG. 4, and FIG. 11 shows schematic views illustrating a capacitance formed in the touch sensing unit according to one embodiment of the disclosure. It is illustrated in FIGS. 8 and 10 that each of the main patterns and each of the outer patterns have a rhombus shape in which irregularities are omitted and four line segments have a completely linear shape.

Referring to FIGS. 8 to 11, the first compensation pattern CP1 and the second compensation patter CP2 may be arranged in the touch peripheral area TPA. Although the second outer part OS2 and the compensation patterns connected thereto have been illustrated, this may be equally applied to the first outer part OS1, the third outer part OS3, and the fourth outer part OS4.

The compensation patterns CP1 and CP2 may be arranged along the edge of the touch sensing area TSA in the touch peripheral area TPA. The compensation patterns CP1 and CP2 may each be connected to one of the plurality of electrodes IE1 and IE2 spaced apart from each other in a direction intersecting an extension direction.

For example, the first compensation patterns CP1 may each be connected to one of the plurality of first electrodes IE1 spaced apart from each other in the second direction DR2, and the second compensation pattern CP2 may each be connected to one of the plurality of second electrodes IE2 spaced apart from each other in the first direction.

The first compensation pattern CP1 may include a first compensation peripheral part CPE1 and a first compensation connection part CPB1. The first compensation pattern CP1 has a third area. The third area may be greater than the second area of the first outer pattern EP1. The disclosure is not necessarily limited thereto, and the third area of the first compensation pattern CP1 may be smaller than the second area of the first outer pattern EP1.

The first compensation connection part CPB1 may protrude from the first compensation peripheral part CPE1 toward the first outer pattern EP1 and may be connected to the first outer pattern EP1. The first compensation connection part CPB1 may be partially disposed in the touch sensing area TSA and may overlap the first outer pattern EP1 in a plan view.

The first compensation peripheral part CPE1 may be disposed on the touch peripheral area TPA. The first compensation peripheral part CPE1 may be adjacent to the first outer pattern EP1 connected thereto. For example, the first compensation peripheral part CPE1 may be spaced apart from the first outer pattern EP1 and extend along an edge of the first outer pattern EP1.

The first compensation peripheral part CPE1 may be disposed between the first outer pattern EP1 and the first driving wire TL1, but the disclosure is not necessarily limited thereto. Further, the first compensation peripheral part CPE1 may be disposed between the first outer pattern EP1 and the first sensing wire RL1.

When the first compensation peripheral part CPE1 is disposed between the first outer pattern EP1 and the driving wire TL, the first compensation pattern CP1 may serve to secure a physical distance between the electrodes and the wires.

The first compensation peripheral part CPE1 of the first compensation pattern CP1 may be electrically connected to the first outer pattern EP1 through the first compensation connection part CPB1. Thus, the first compensation pattern CP1 may receive substantially the same signal as the first main pattern SP1.

For example, the first main pattern SP1 and the first outer pattern EP1 of the first electrode TE1 and the first compensation connection part CPB1 and the first compensation peripheral part CPE1 of the first compensation pattern CP1 may be electrically connected. The first main pattern SP1, the first outer pattern EP1, and the first compensation pattern CP1 may be electrically connected to receive a common signal. Accordingly, a capacitor having a compensation capacitance value Cm3 may be formed between the first compensation pattern CP1 and the second outer pattern EP2. The formed capacitor may increase a total capacitance value formed in the unit sensing area SUT located in the outer part OS.

For example, since the first compensation pattern CP1 may reduce a difference between areas of the first outer pattern EP1 and the first main pattern SP1, a difference between capacitances of the unit sensing area SUT of the outer part OS and the unit sensing area SUT of the inner part IS may be reduced. Thus, the uniformity of touch sensitivity can be increased.

For example, since the first compensation pattern CP1 is electrically connected to the first outer pattern EP1 through a third contact hole CNT3, an electrode area of each unit sensing area SUT located in the second outer part OS2 may be compensated for. Accordingly, the capacitance value formed in the second outer part OS2 can be increased, and the uniformity of touch sensitivity of the touch sensing unit TSU can be increased.

Likewise, the first compensation pattern CP1, the second compensation pattern CP2 may include a second compensation connection part CPB2 and a second compensation peripheral part CPE2. The second compensation pattern CP2 has the third area.

The second compensation connection part CPB2 may protrude from the second compensation peripheral part CPE2 toward the second outer pattern EP2 and may be connected to the second outer pattern EP2. The second compensation connection part CPB2 may be partially disposed in the touch sensing area TSA and may overlap the second outer pattern EP2 in a plan view.

The second compensation peripheral part CPE2 may be disposed on the touch peripheral area TPA. The second compensation peripheral part CPE2 may be adjacent to the second outer pattern EP2 connected thereto. For example, the second compensation peripheral part CPE2 may be spaced apart from the second outer pattern EP2 and may extend along an edge of the second outer pattern EP2.

The second compensation peripheral part CPE2 may be disposed outside of the second outer pattern EP2 and the second sensing wire RL2, but the disclosure is not necessarily limited thereto. For example, the second compensation peripheral part CPE2 may be disposed between the second outer pattern EP2 and the second sensing wire RL2. Further, the second compensation peripheral part CPE2 may be disposed between the second outer pattern EP2 and the second driving wire TL2.

When the second compensation peripheral part CPE2 is disposed between the second outer pattern EP2 and the sensing wire RL, the second compensation pattern CP2 may serve to secure a physical distance between the electrodes and the wires.

The second compensation peripheral part CPE2 of the second compensation pattern CP2 may be electrically connected to the second outer pattern EP2 through the second compensation connection part CPB2. Thus, the second compensation pattern CP2 may receive substantially the same signal as the second main pattern SP2.

For example, the second main pattern SP2 and the second outer pattern EP2 of the second electrode IE2 and the second compensation connection part CPB2 and the second compensation peripheral part CPE2 of the second compensation pattern CP2 may be electrically connected. The second main pattern SP2, the second outer pattern EP2, and the second compensation pattern CP2 may be electrically connected to receive a common signal. Accordingly, a capacitor having a compensation capacitance value Cm2 may be formed between the second compensation pattern CP2 and the first outer pattern EP1. The formed capacitor may increase a total capacitance value formed in the unit sensing area SUT located in the outer part OS.

For example, since the first compensation pattern CP1 may reduce a difference between areas of the first outer pattern EP1 and the first main pattern SP1, a difference between capacitances of the unit sensing area SUT of the outer part OS and the unit sensing area SUT of the inner part IS may be reduced. Thus, the uniformity of touch sensitivity can be increased.

According to the embodiment, the touch sensing unit TSU includes the first compensation pattern CP1 and the second compensation pattern CP2, and thus a touch input may be easily sensed not only in the inner part IS but also the outer part OS of the touch sensing area TSA. Accordingly, a substantial touch sensing area for sensing a touch input may partially extend to the touch peripheral area TPA.

Further, since the first and second compensation patterns CP1 and CP2 are arranged in the touch peripheral area TPA adjacent to the first and second outer patterns EP1 and EP2 having areas that are relatively smaller than those of the first and second main patterns SP1 and SP2, the touch sensitivity of the first and second outer patterns EP1 and EP2 can be compensated, and the touch sensitivity in the touch sensing area TSA can be uniformly maintained.

In the embodiment, the locations of the compensation patterns may be variously changed. For example, when each of the plurality of driving wires TL are connected to the lower end of the first electrode IE1, the first compensation patterns CP1 may be connected only to the first other-side outer pattern EP1l among the first outer patterns EP1. For example, when each of the plurality of sensing wires RL are connected to the left end of the second electrode IE2, the second compensation patterns CP2 may be connected only to the second one-side outer pattern EPr2 among the second outer patterns EP2.

Referring to FIG. 9, the first compensation connection part CPB1, the first compensation peripheral part CPE1, and the first driving wire TL1 may be arranged in the first touch conductive layer 210. The first outer pattern EP1 may be disposed in the second touch conductive layer 220 with the first touch insulating layer 215 interposed therebetween. The first touch insulating layer 215 may include the third contact hole CNT3. The first outer pattern EP1 and the first compensation connection part CPB1 of the first compensation pattern CP1 may be electrically connected through the third contact hole CNT3.

A portion of the first compensation connection part CPB1 may overlap the first outer pattern EP1 in the touch sensing area TSA, and the other portion of the first compensation connection part CPB1 may overlap the light blocking member BM disposed on the window WDL in the touch peripheral area TPA.

The first compensation peripheral part CPE1 and the first driving wire TL1 may overlap the light blocking member BM in the touch peripheral area TPA.

The light blocking member BM, according to the embodiment, may overlap the plurality of signal wires and the plurality of first and second compensation patterns CP1 and CP2 arranged in the first touch conductive layer 210 in the touch peripheral area TPA. Accordingly, the light blocking member BM may prevent the plurality of signal wires and the compensation patterns formed around the touch sensing area TSA from being visually recognized from the outside.

Figure 12:
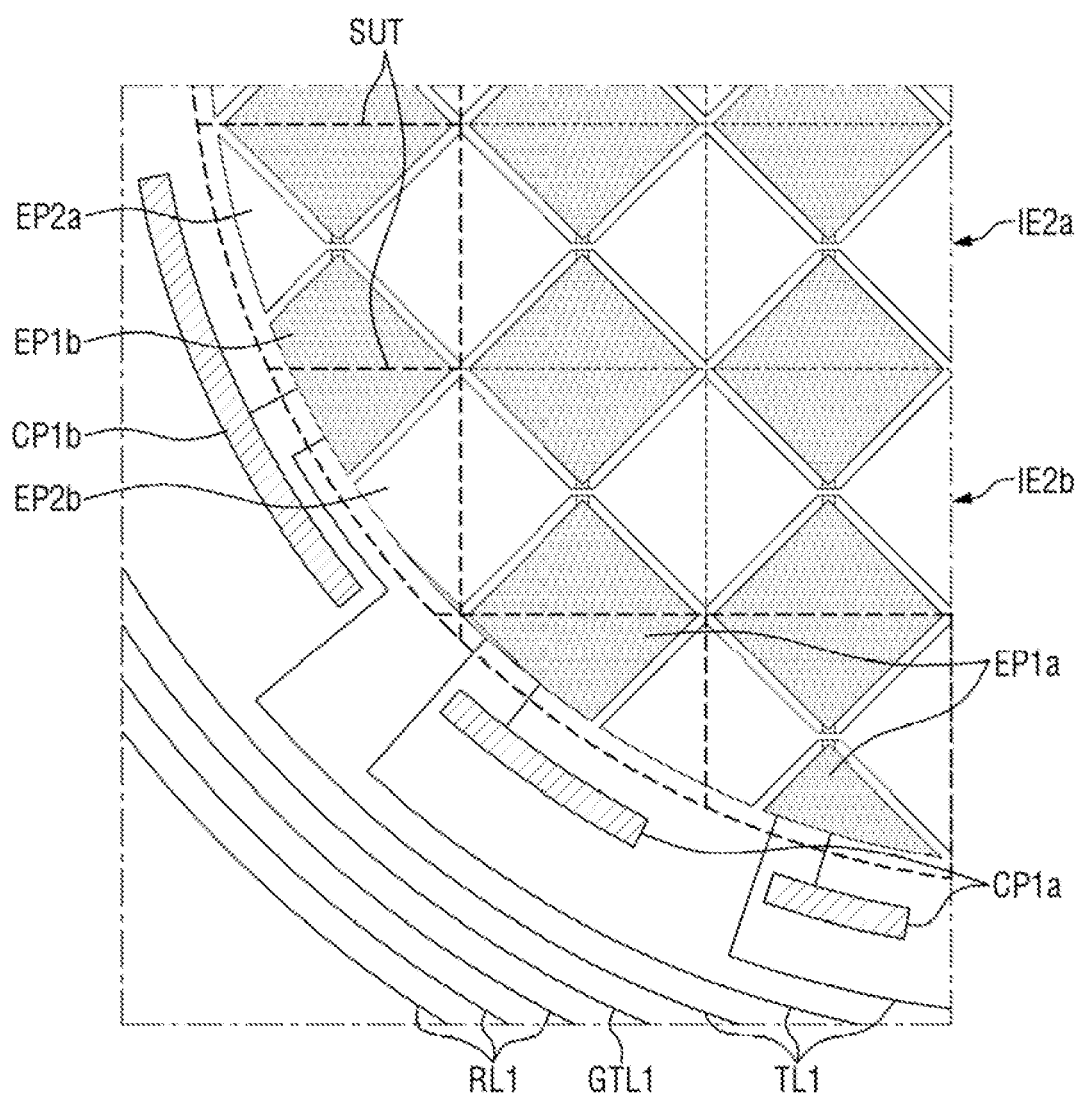
FIG. 12 is a part of the schematic plan view illustrating a layout of the touch sensing unit of FIG. 4.

FIG. 12 is a part of the schematic plan view illustrating a layout of the touch sensing unit of FIG. 4.

Referring to FIG. 12, at least one compensation pattern among the plurality of compensation patterns arranged in an extension direction of one electrode may be simultaneously adjacent to two adjacent electrodes (or outer patterns) intersecting the extension direction of the one electrode.

For example, at least one first compensation pattern CP1b among a plurality of first compensation patterns CP1a and CP1b arranged at one end or the other end of the first electrode IE1 extending in the first direction DR1 may be simultaneously adjacent to two adjacent second electrodes IE2a and IE2b extending in the second direction DR2. Alternatively, the first compensation pattern CP1b may be simultaneously adjacent to second outer patterns EP2a and EP2b included in the two adjacent second electrodes IE2a and IE2b.

Further, the first compensation pattern CP1b connected to a first outer pattern EP1b disposed between the two adjacent second electrodes IE2a and IE2b may be disposed along edges of the two second outer patterns EP2a and EP2b and the one first outer pattern EP1b. The first compensation pattern CP1b may be adjacent to the plurality of outer patterns EP1b, EP2a, and EP2b along the edge of the touch sensing area TSA. The first compensation pattern CP1b may be disposed outside of the first driving wire TL1, but the disclosure is not necessarily limited thereto.

Since the compensation pattern is connected to the outer pattern disposed between two adjacent electrodes, the two unit sensing areas SUT arranged in the outer part OS may be simultaneously compensated.

For example, since the first compensation pattern CP1b is connected to the first outer pattern EP1b disposed between the two adjacent second electrodes IE2a and IE2b, the unit sensing area SUT formed in a region in which the first electrode IE1 and the second electrode IE2a intersect each other and the unit sensing area SUT formed in a region in which the first electrode IE1 and the second electrode IE2b intersect each other may be simultaneously compensated.

The area of the first outer pattern EP1b may be increased due to the first compensation pattern CP1b. Accordingly, the capacitance values of the unit sensing area SUT formed in the region in which the first electrode IE1 and the second electrode IE2a intersect each other and the unit sensing area SUT formed in the region in which the first electrode IE1 and the second electrode IE2b intersect each other may increase. To this end, a difference between the area of the first outer pattern EP1b and the area of the first main pattern SP1 may be reduced.

Accordingly, a difference between the touch sensitivities of the inner part IS and the outer part OS of the touch sensing unit TSU may be minimized.

Referring to FIG. 10, this may be equally applied to the second compensation pattern CP2. For example, at least one second compensation pattern CP2 among the plurality of second compensation patterns CP2 arranged at one end or the other end of the second electrode IE2 extending in the second direction DR2 may be simultaneously adjacent to the two adjacent first electrodes IE1 (or the first outer pattern EP1) extending in the first direction DR1.

Accordingly, the capacitance values of at least two unit sensing areas SUT among the unit sensing areas SUT of the outer part OS may be increased by one compensation pattern. Accordingly, the design efficiency of the touch sensing unit TUS can be increased.

In the embodiment, it is exemplified that each of the compensation patterns compensates for the two unit sensing areas SUT and is adjacent to the three outer patterns, but the numbers are merely an example, and various numbers may be applied according to modification of the touch sensing unit TSU.

Figure 13:
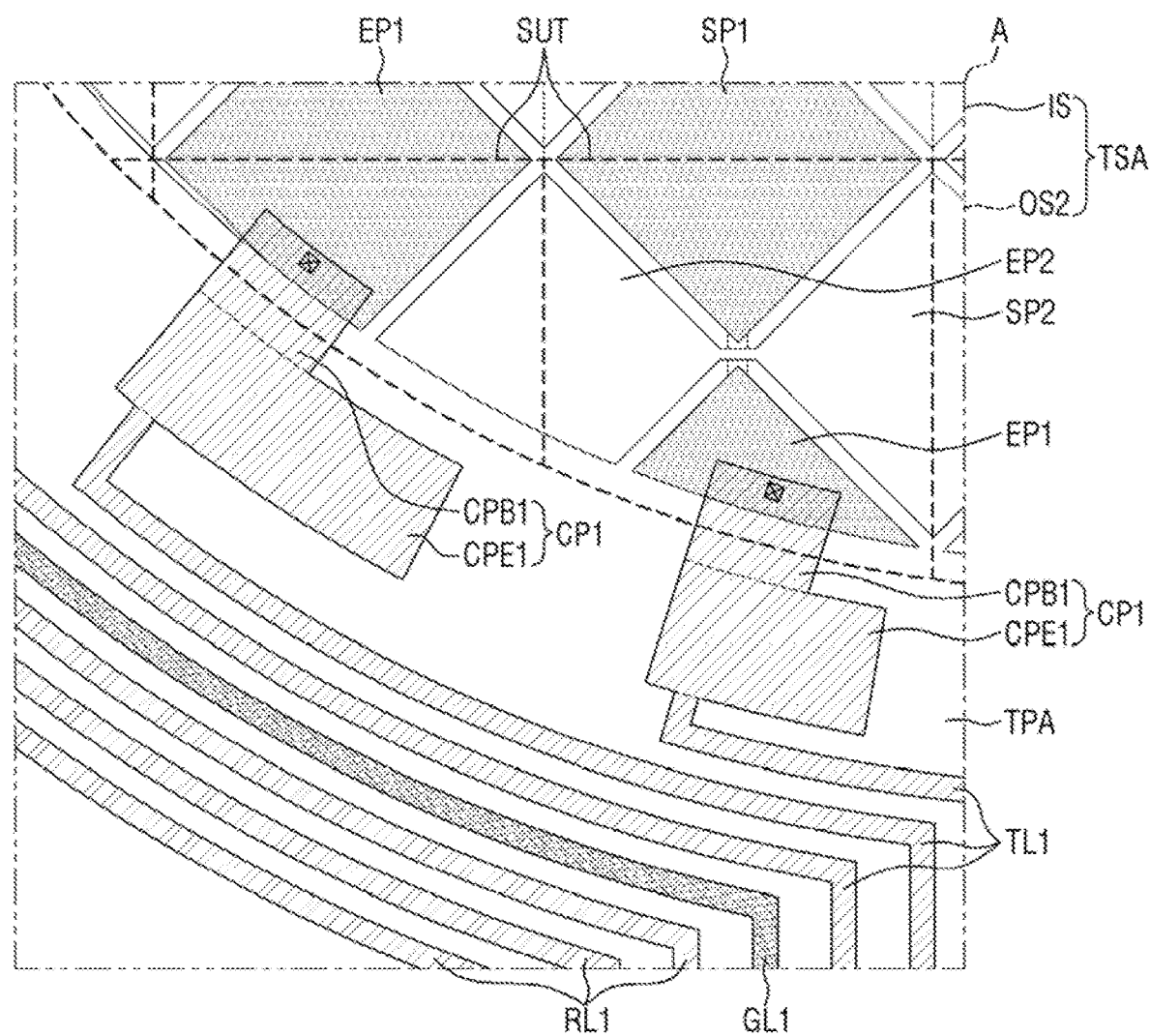
FIG. 13 is an enlarged plan view illustrating an example of region A of FIG. 4.

FIG. 13 is an enlarged plan view illustrating another example of region A of FIG. 4.

Referring to FIG. 13, the embodiment is different from the previous embodiment in that the plurality of signal wires are not connected to the first and second outer patterns EP1 and EP2 arranged in the touch sensing area TSA and are connected to the first and second compensation patterns CP1 and CP2 arranged in the touch peripheral area TPA. It may be assumed that other elements are at least similar to corresponding elements described elsewhere within the disclosure.

For example, the first compensation connection part CPB1 of the first compensation pattern CP1 may be connected to the first outer pattern EP1 in the touch sensing area TSA, and the first compensation peripheral part CPE1 of the first compensation pattern CP1 may be connected to the first driving wire TL1 (or the second driving wire TL2) in the touch peripheral area TPA.

The second compensation connection part CPB2 of the second compensation pattern CP2 may be connected to the second outer pattern EP2, and the second compensation peripheral part CPE2 of the second compensation pattern CP2 may be connected to the first sensing wire RL1 or the second sensing wire RL2.

Accordingly, the first and second compensation patterns CP1 and CP2 may compensate for the area of the unit sensing area SUT of the outer part OS, thereby increasing the touch sensitivity of the touch sensing unit TSU.

Figure 14:
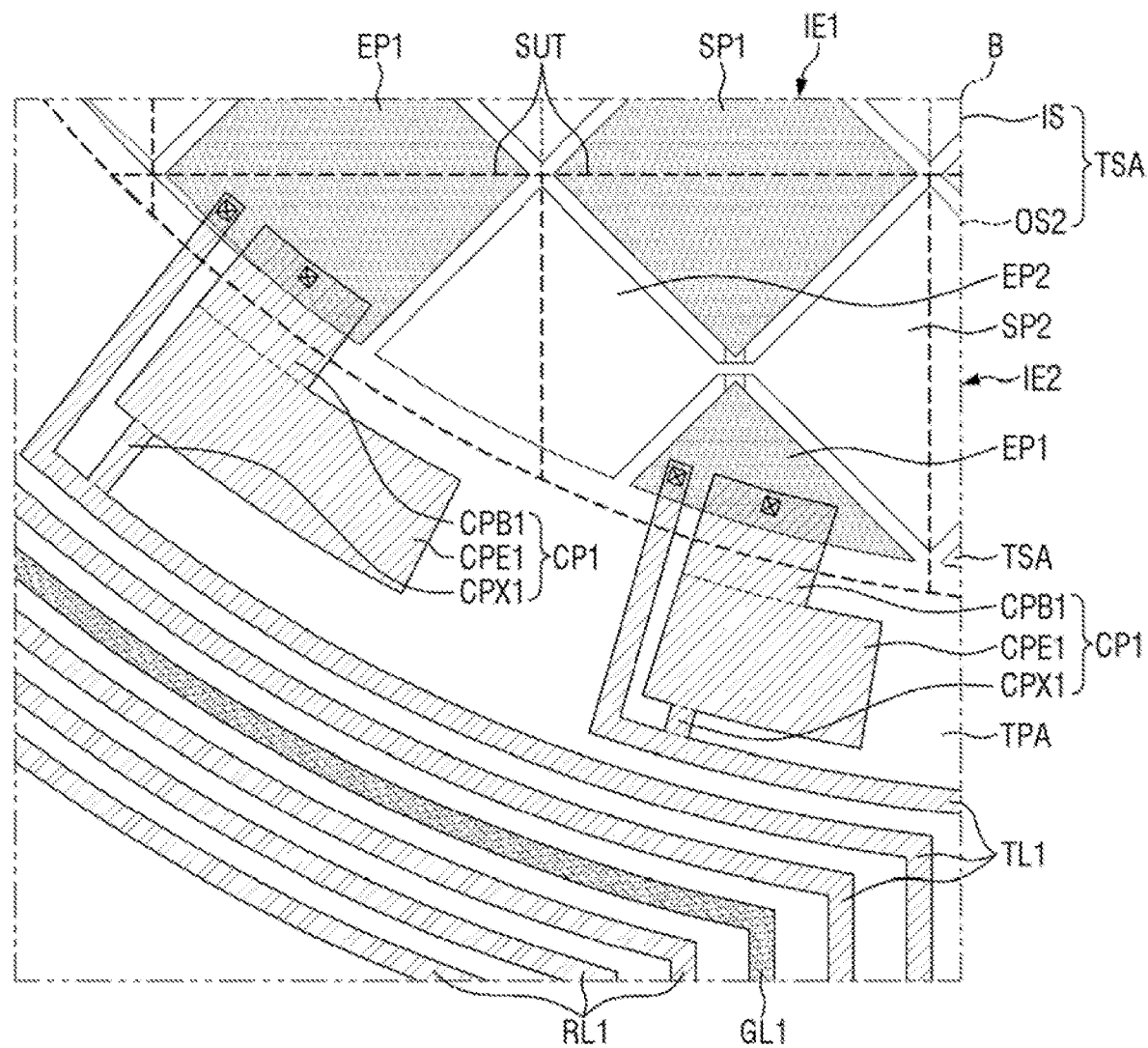
FIG. 14 is an enlarged plan view illustrating an example of region A of FIG. 4.

FIG. 14 is an enlarged plan view illustrating an example of region A of FIG. 4.

Referring to FIG. 14, the embodiment is different from the previous embodiment in that first and second compensation lines CPX1 and CPX2 to which the plurality of signal wires and the first and second compensation patterns CP1 and CP2 are connected are further included.

In detail, the driving wires TL and the sensing wires RL arranged in the touch sensing area TSA may be connected to the first and second outer patterns EP1 and EP2 and, at the same time, may be connected to the first and second compensation patterns CP1 and CP2 arranged in the touch peripheral area TPA.

For example, the first compensation connection part CPB1 of the first compensation pattern CP1 may be connected to the first outer pattern EP1 in the touch sensing area TSA, the first compensation peripheral part CPE1 of the first compensation pattern CP1 may be arranged in the touch peripheral area TPA, and the first compensation line CPX1 may be connected to the first driving wire TL1 in the touch peripheral area TPA. At the same time, the first outer pattern EP1 may be connected to the first driving wire TL1.

In the embodiment, each of the plurality of signal wires TL and RL is connected to the first and second outer patterns EP1 and EP2 and the first and second compensation patterns CP1 and CP2, and thus smooth flow of a driving signal and a sensing signal flowing in the first electrode IE1 and the second electrode IE2 can be maintained.

In the embodiment of FIGS. 4 to 14, the first and second compensation patterns CP1 and CP2 arranged in the touch peripheral area TPA are electrically connected to the first and second outer patterns EP1 and EP2, and thus the touch sensitivity of the touch sensing unit TSU can be increased. Further, the touch sensitivity of the inner part IS and the outer part OS can be uniformly maintained.

Further, since the touch sensitivity can be increased by applying a touch signal to electrode patterns (for example, the compensation patterns) arranged around the touch sensing area TSA, the display device in which a change of the design of the touch sensing unit TSU is minimized may be implemented.

Hereinafter, the touch sensing unit TSU according to an embodiment of the disclosure will be described. In the following embodiment, the same components as those of the previously described embodiment are designated by the same reference numerals, and thus to the extent that one or more elements is not described in detail herein, it may be assumed that those elements are at least similar to corresponding elements that have been described elsewhere within the disclosure.

Figure 15:
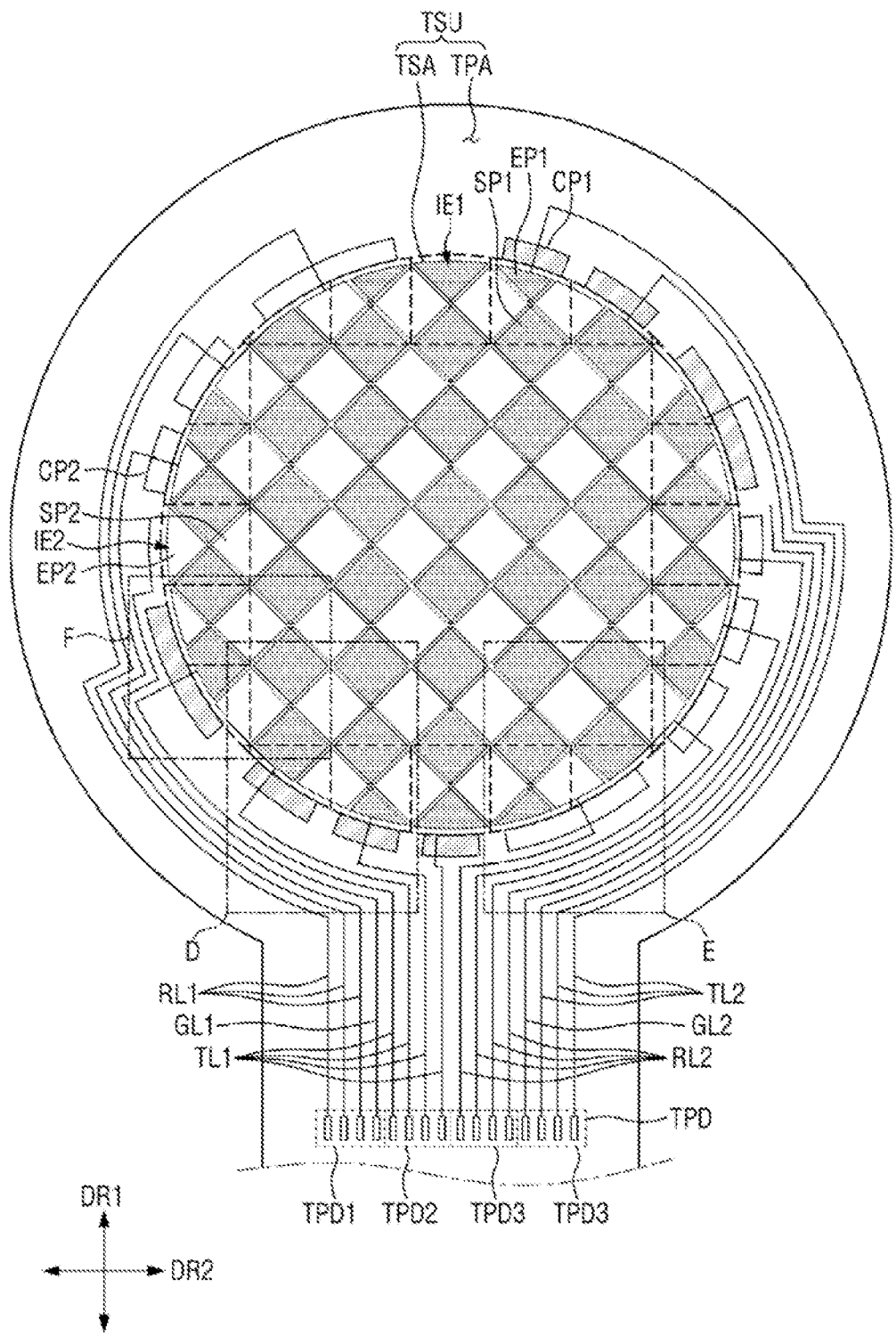
FIG. 15 is a schematic plan view of a layout of a touch sensing unit according to an embodiment of the disclosure.
Figure 16:
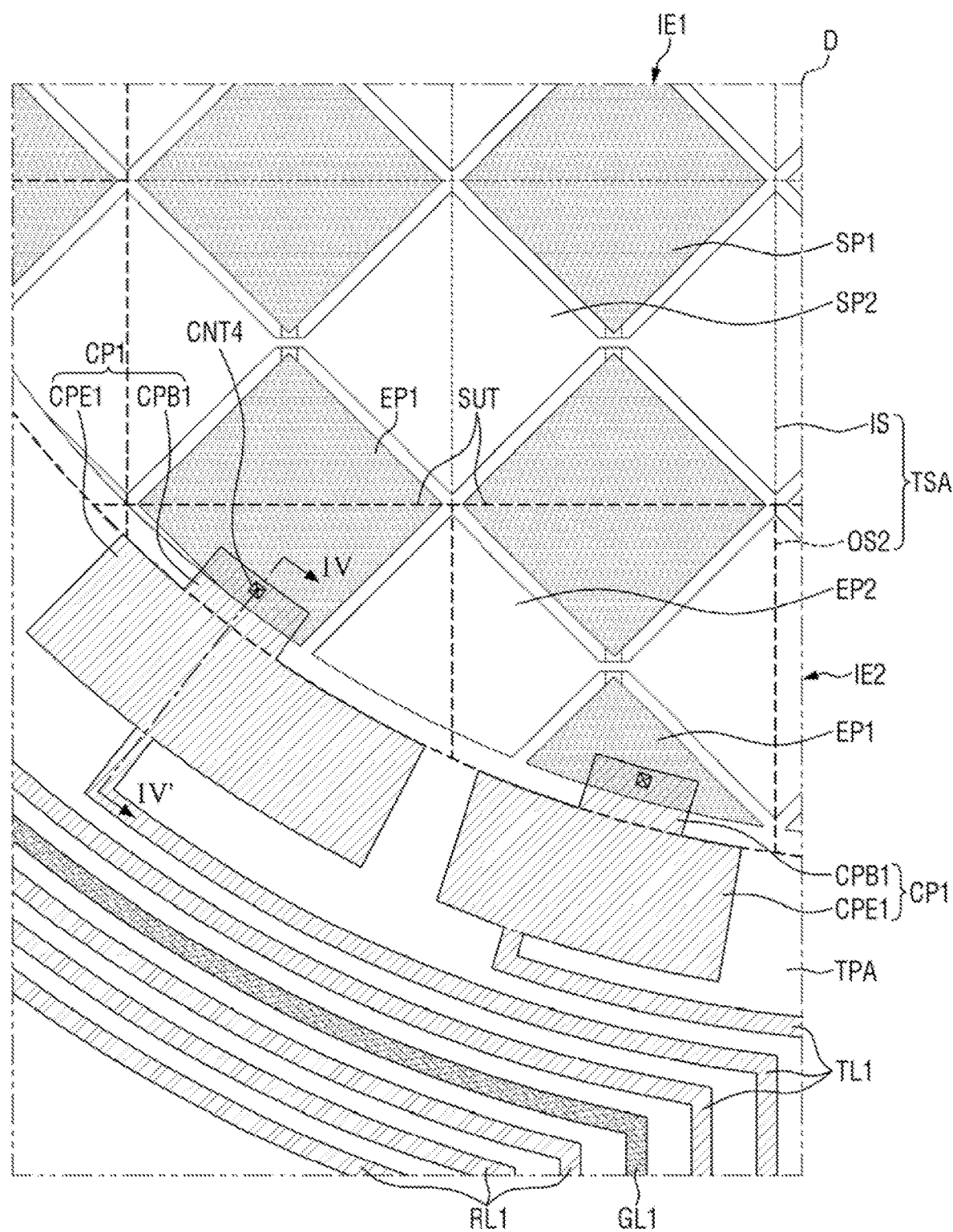
FIG. 16 is an enlarged plan view illustrating an example of region D of FIG. 15.
Figure 17:
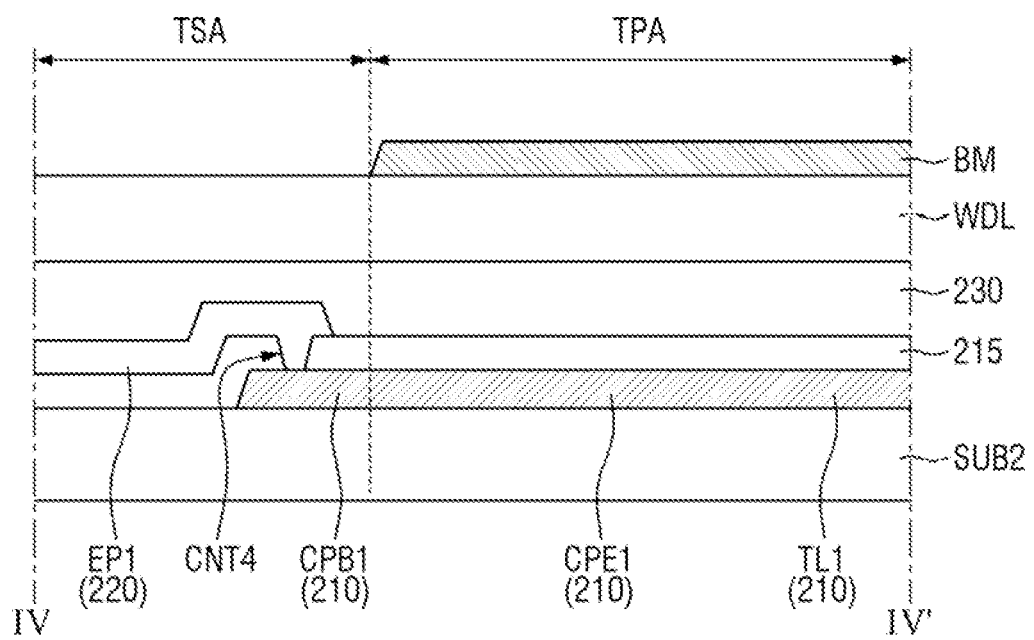
FIG. 17 is a cross-sectional view taken along line IV-IV' of FIG. 16.
Figure 18:
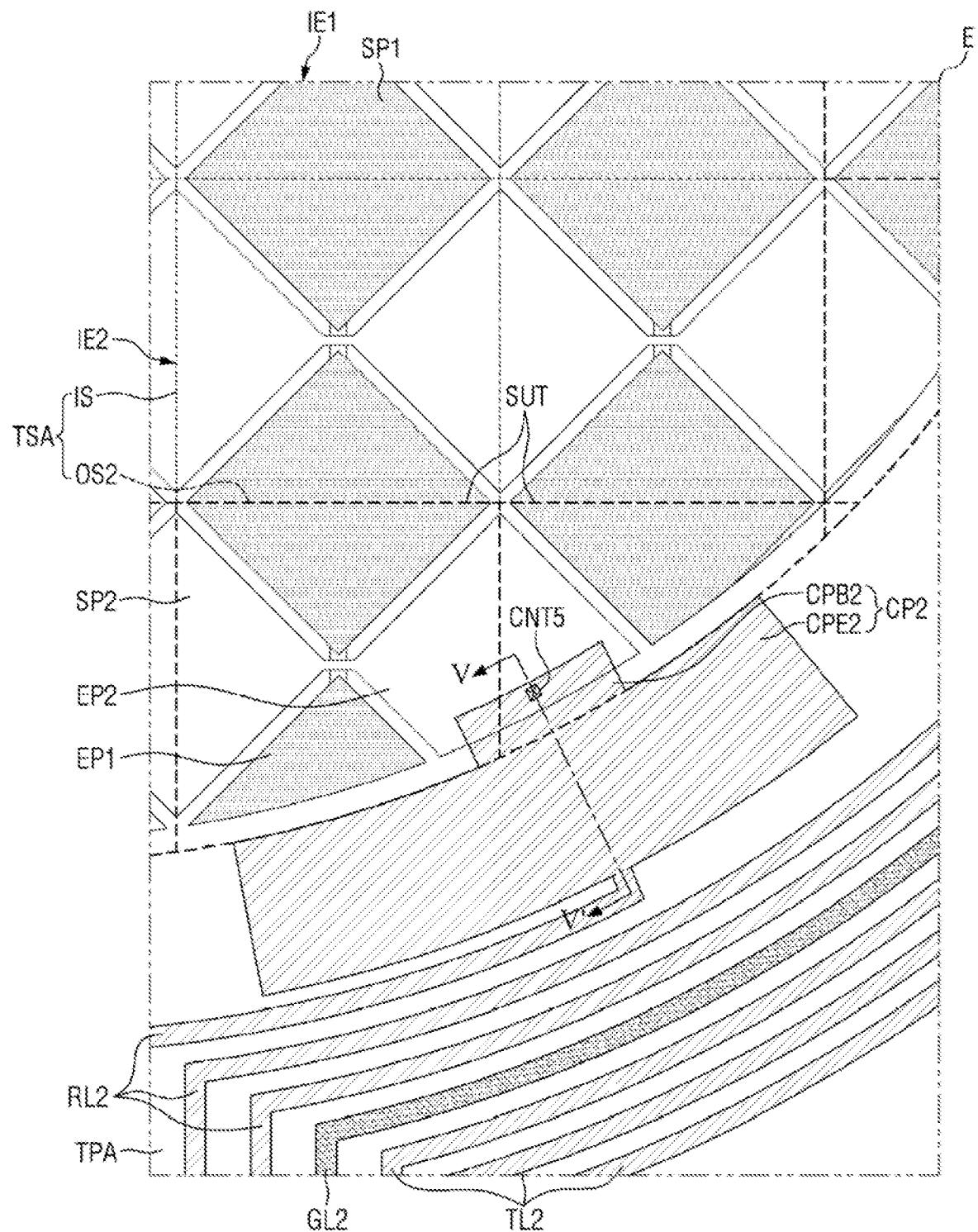
FIG. 18 is an enlarged plan view illustrating an example of region E of FIG. 15.
Figure 19:
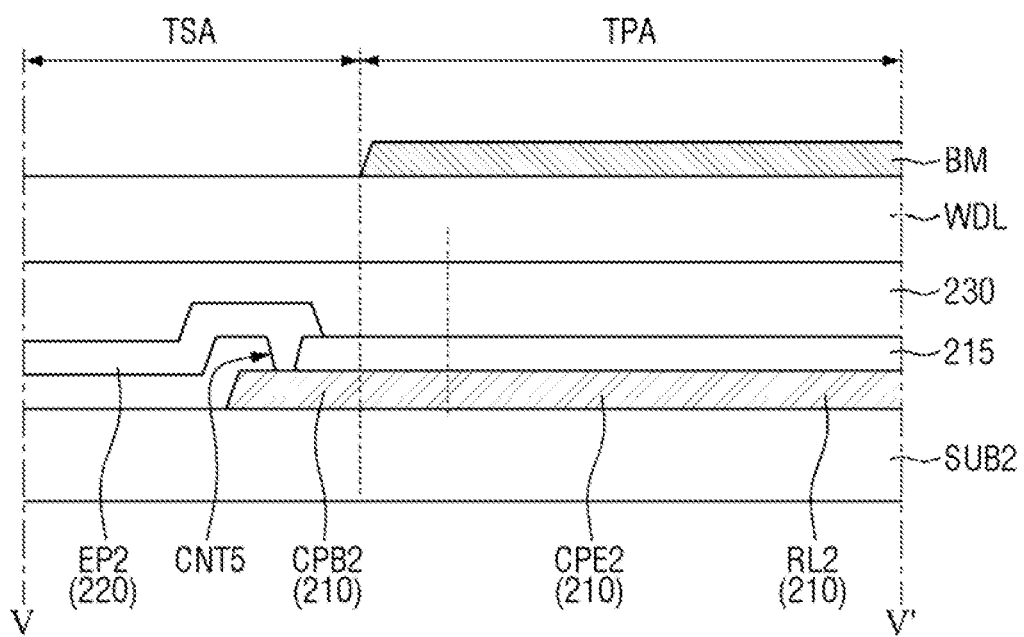
FIG. 19 is a cross-sectional view taken along line V-V' of FIG. 18.

FIG. 15 is a schematic plan view of a layout of a touch sensing unit according to an embodiment of the disclosure, FIG. 16 is an enlarged plan view illustrating an example of region D of FIG. 15, FIG. 17 is a cross-sectional view taken along line IV-IV' of FIG. 16. FIG. 18 is an enlarged plan view illustrating an example of region E of FIG. 15, and FIG. 19 is a cross-sectional view taken along line V-V' of FIG. 18. It is illustrated in FIGS. 15 to 19 that each of the main patterns and each of the outer patterns have a rhombus shape in which irregularities are omitted and four line segments have a completely linear shape.

The touch sensing unit TSU according to the embodiment is different from the touch sensing unit TSU according to the prior embodiment in that the first and second compensation patterns CP1 and CP2 are close to the touch sensing area TSA, and the widths of the first and second compensation patterns CP1 and CP2 are large.

In detail, in the embodiment, the first and second compensation connection parts CPB1 and CPB2 may be arranged exclusively in the touch sensing area TSA. Further, the first and second compensation peripheral parts CPE1 and CPE2 may completely overlap the light blocking member BM on the window WDL.

Further, in the touch sensing unit TSU according to the embodiment, the first compensation pattern CP1 may be connected to the first outer pattern EP1 through a contact hole (for example, CNT4), and the second compensation pattern CP2 may be connected to the second outer pattern EP2 through a contact hole (for example, CNT5). In this case, the first compensation pattern CP1 may be connected to the first and second driving wires TL1 and TL2, and the second compensation pattern CP2 may be connected to the first and second sensing wires RL1 and RL2.

Referring to FIGS. 17 and 19, the first touch conductive layer 210 may include the first and second compensation patterns CP1 and CP2 having the first and second compensation connection parts CPB1 and CPB2 arranged in the touch sensing area TSA and the first and second compensation peripheral parts CPE1 and CPE2 arranged in the touch peripheral area TPA, the first and second driving wires TL1 and TL2, and the first and second sensing wires RL1 and RL2. The second touch conductive layer 220 may include the first and second main patterns SP1 and SP2 and the first and second outer patterns EP1 and EP2 arranged in the touch sensing area TSA.

Accordingly, the unit sensing area SUT of the outer part OS may be compensated for through the first and second compensation patterns CP1 and CP2 having a large area, thereby further increasing the touch sensitivity of the touch sensing unit TSU.

Hereinafter, the touch sensing unit TSU according to an embodiment of the disclosure will be described.

Figure 20:
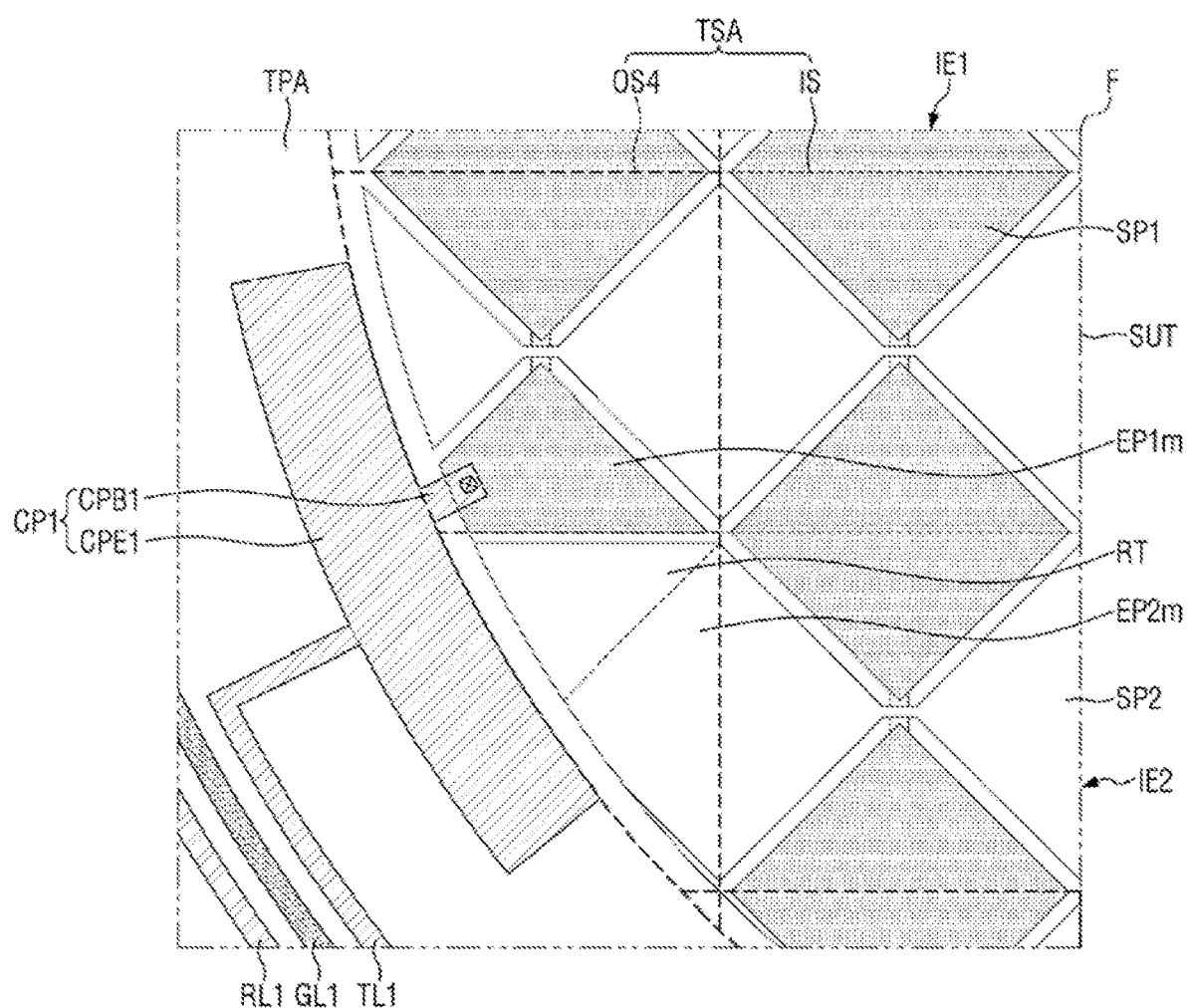
FIG. 20 is an enlarged plan view illustrating an example of region D of FIG. 15.
Figure 21:
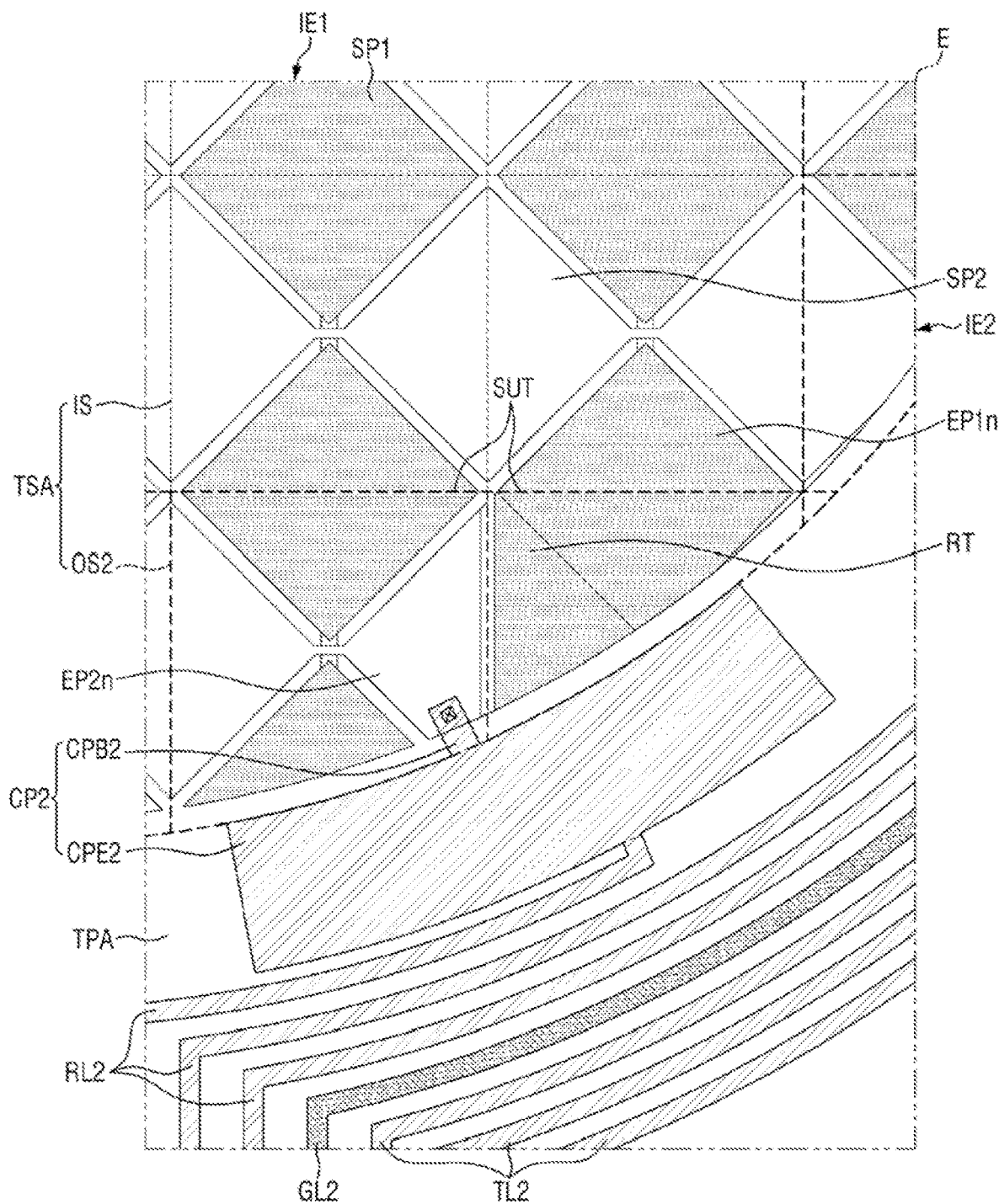
FIG. 21 is an enlarged plan view illustrating an example of region E of FIG. 15.
Figure 22:
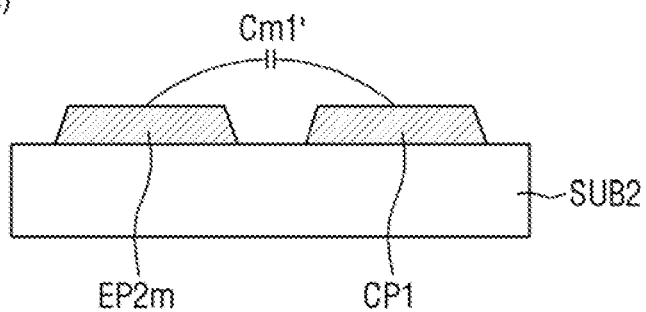
FIG. 22 shows schematic views illustrating a capacitance formed in the touch sensing unit of FIGS. 20 and 21.
Figure 22:
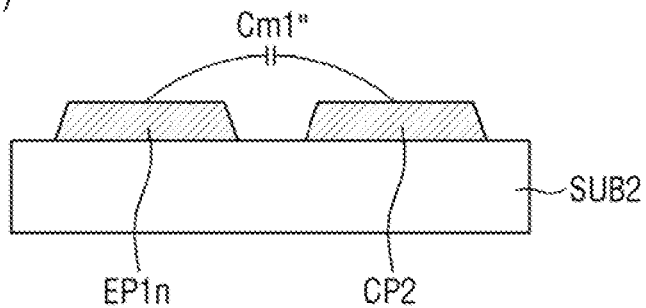

FIG. 20 is an enlarged plan view illustrating an example of region D of FIG. 15, FIG. 21 is an enlarged plan view illustrating an example of region E of FIG. 15, and FIG. 22 shows schematic views illustrating a capacitance formed in the touch sensing unit of FIGS. 20 and 21. FIG. 22, element (a) is a schematic view illustrating a capacitance formed in the touch sensing unit of FIG. 20, and FIG. 22, element (b) is a schematic view illustrating a capacitance formed in the touch sensing unit of FIG. 21.

Referring to FIGS. 20 to 22, the touch sensing unit TSU according to the embodiment is different from the touch sensing unit TSU according to the prior embodiment in terms of the shapes of first outer patterns EP1$m$ and EP1$n$ and second outer patterns EP2$m$ and EP2$n$.

When a corresponding area of the plurality of unit sensing areas SUT located in the outer part OS is 50% or less of the area of the unit sensing area SUT located in the inner part IS, the first outer patterns EP1$m$ and EP1$n$ or the second outer patterns EP2$m$ and EP2$n$ of the touch sensing unit TSU may include a protrusion part RT. It is exemplified in the embodiment that a criterion for forming the protrusion part RT is 50%, but the disclosure is not necessarily limited thereto, and this may be applied to all of the unit sensing areas SUT that need to be formed in substantially the same ratio as that of the unit sensing area SUT of the inner part IS.

When the area of the outer pattern connected to the compensation pattern is excessively greater than the area of the outer pattern adjacent to the outer pattern, the area forming the capacitance is different, and thus the touch sensitivity may be non-uniform. The protrusion part RT may be formed in the outer pattern adjacent thereto and may increase the area of the outer pattern.

For example, the area of the first outer pattern EP1$m$ is decreased by the area increased by the first compensation pattern CP1, the protrusion part RT corresponding to the decreased area is formed in the second outer pattern EP2$m$, and thus the area of the second outer pattern EP2$m$ can be increased.

As an example, the area of the second outer pattern EP2$n$ is decreased by the area increased by the second compensation pattern CP2, the protrusion part RT corresponding to the decreased area is formed in the first outer pattern EP1$n$, and thus the area of the first outer pattern EP1$n$ can be increased.

In FIG. 20, the protrusion part RT of the second outer pattern EP2$m$ may protrude toward the first outer pattern EP1$m$. The protrusion part RT of the second outer pattern EP2$m$ may protrude in a direction perpendicular to or inclined with respect to a direction in which the first electrode IE1 extends. Further, the protrusion part RT of the second outer pattern EP2$m$ may extend inward of the first electrode IE1. The area of the second outer pattern EP2$m$ disposed in the fourth outer part OS4 may be increased by the protrusion part RT.

The first outer pattern EP1$m$ adjacent to the second outer pattern EP2$m$ may include a recessed part recessed in a direction opposite to the protrusion part RT. The first compensation pattern CP1 adjacent to the second outer pattern EP2m may be connected to the first outer pattern EP1m including the recessed part.

Accordingly, a ratio of the area formed between the second outer pattern EP2m and the first compensation pattern CP1 may be substantially the same as or close to a ratio of the area formed between the first main pattern SP1 and the second main pattern SP2 of the inner part IS.

Referring to FIG. 22, element (a), a capacitance value Cm1' formed by the second outer pattern EP2m and the first compensation pattern CP1 may be substantially the same as or close to the capacitance value Cm1 formed by the first main pattern SP1 and the second main pattern SP2 of FIG. 11. In this case, the touch sensitivity of the outer part OS and the inner part IS of the touch sensing unit TSU may become uniform. For example, a decrease in the touch sensitivity of the outer part OS of the touch sensing area TSA can be prevented.

In FIG. 21, the protrusion part RT of the first outer pattern EP1n may protrude toward the second outer pattern EP2n. The protrusion part RT of the first outer pattern EP1n may protrude in a direction perpendicular or inclined to a direction in which the second electrode IE2 extends. Further, the protrusion part RT of the first outer pattern EP1n may extend inward of the second electrode IE2. The area of the first outer pattern EP1n disposed in the second outer part OS2 may be increased by the protrusion part RT.

The second outer pattern EP2n adjacent to the first outer pattern EP1n may include a recessed part recessed in a direction opposite to the protrusion part RT. The second compensation pattern CP2 adjacent to the first outer pattern EP1n may be connected to the second outer pattern EP2n including the recessed part.

Accordingly, a ratio of the area formed between the first outer pattern EP1n and the second compensation pattern CP2 may be substantially the same as or close to the ratio of the area formed between the first main pattern SP1 and the second main pattern SP2 of the inner part IS.

Referring to FIG. 22, element (b), a capacitance value Cm1" formed by the first outer pattern EP1n and the second compensation pattern CP2 may be substantially the same as or close to the capacitance value Cm1 formed by the first main pattern SP1 and the second main pattern SP2 of FIG. 11. In this case, the touch sensitivity of the outer part OS and the inner part IS of the touch sensing unit TSU may become uniform. A decrease in the touch sensitivity of the outer part OS of the touch sensing area TSA can be prevented.

Figure 23:
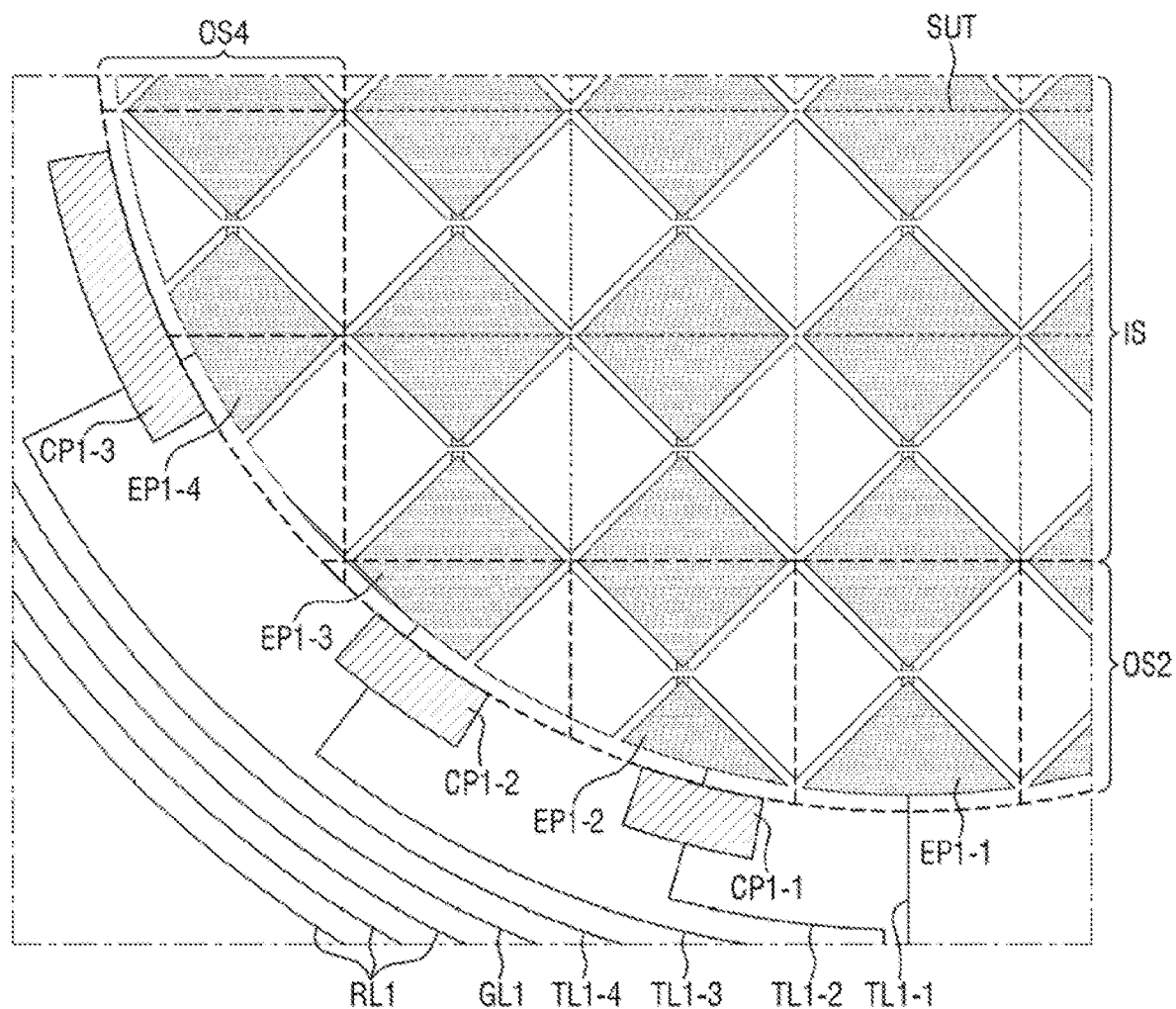
FIGS. 23 and 24 are parts of a schematic plan view of a layout of a touch sensing unit according to an embodiment of the disclosure.
Figure 24:
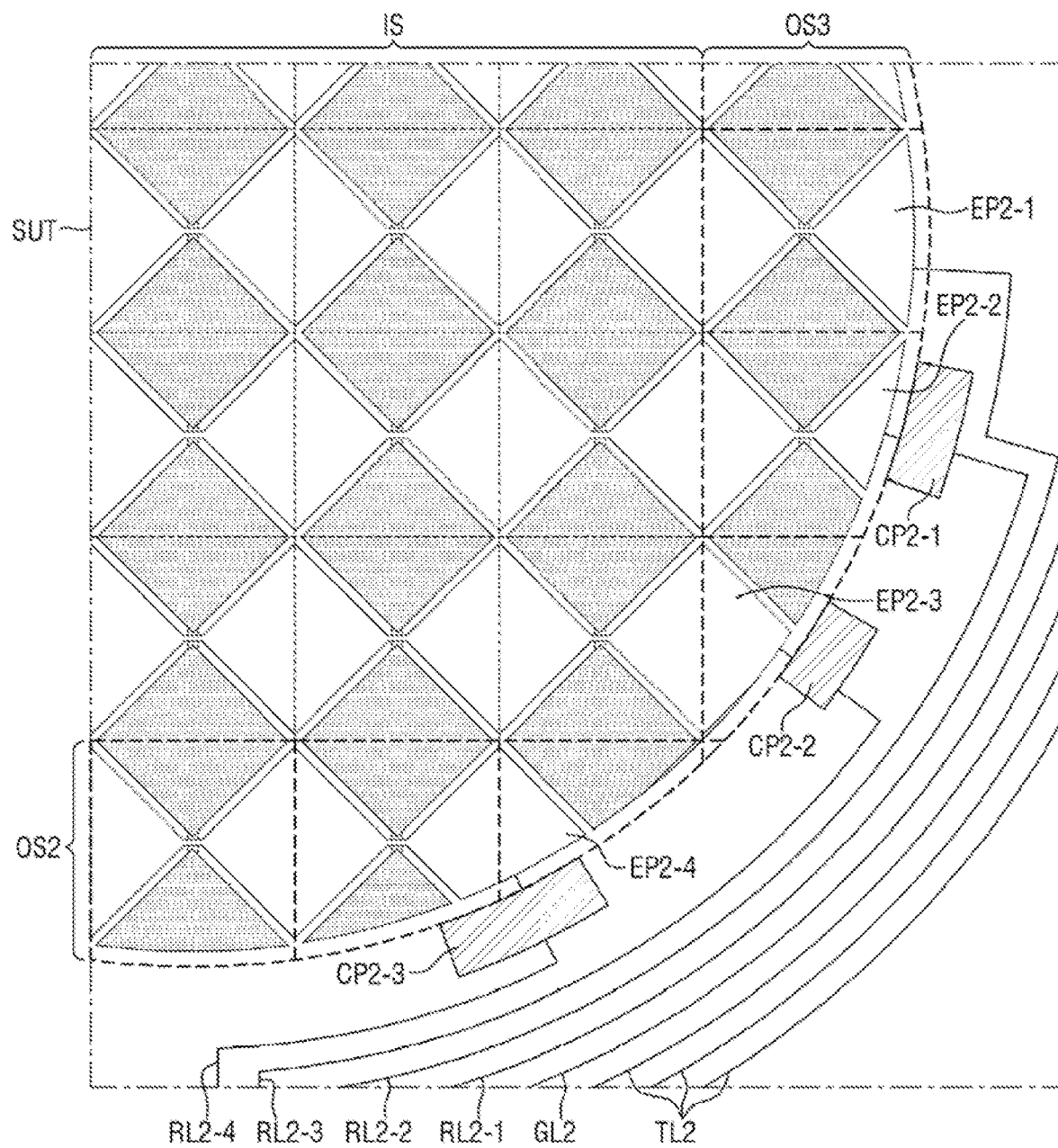

FIGS. 23 and 24 are parts of a schematic plan view of a layout of a touch sensing unit according to an embodiment of the disclosure.

Referring to FIGS. 23 and 24, in the touch sensing unit TSU according to the embodiment, the areas of the first and second compensation patterns CP1 and CP2 connected to the first and second outer patterns EP1 and EP2 may be differently set in consideration of a difference between the areas of the first and second outer patterns EP1 and EP2.

At least some of the unit sensing areas SUT located in the outer part OS of the touch sensing unit TSU may have a larger area than that of the unit sensing area SUT located in the inner part IS. Even in this case, since the capacitance values formed for the unit sensing areas SUT of the touch sensing unit TSU are different, the touch sensitivity may be non-uniform. Thus, compensation patterns having different areas may be connected to the outer patterns arranged in the outer part OS or a compensation pattern might not be connected to any one outer pattern.

For example, first compensation patterns CP1-1, CP1-2, and CP1-3 may have different areas corresponding to areas of the first outer patterns EP1-2, EP1-3, and EP1-4 connected to the first compensation patterns CP1-1, CP1-2, and CP1-3. Second compensation patterns CP2-1, CP2-2, and CP2-3 may have different areas corresponding to areas of the second outer patterns EP2-2, EP2-3, and EP2-4 connected to the second compensation patterns CP2-1, CP2-2, and CP2-3.

For example, the compensation pattern might not be connected to the first outer pattern EP1-1 having a large area and disposed in the unit sensing area SUT among the first outer patterns EP1-1, EP1-2, EP1-3, and EP1-4. Thus, a first driving wire TL1-1 may be directly connected to the first outer pattern EP1-1. In addition, first driving wires TL1-2, TL1-3, and TL1-4 may be connected to the first outer patterns EP1-2, EP1-3, and EP1-4 through the first compensation patterns CP1-1, CP1-2, and CP1-3, respectively.

Further, the compensation pattern might not be connected to the second outer pattern EP2-1 having a large area and disposed in the unit sensing area SUT among the second outer patterns EP2-1, EP2-2, EP2-3, and EP2-4. Thus, a second sensing driving wire RL2-1 may be directly connected to the second outer pattern EP2-1. In addition, second sensing wires RL2-2, RL2-3, and RL2-4 may be connected to the second outer patterns EP2-2, EP2-3, and EP2-4 through the second compensation patterns CP2-1, CP2-2, and CP2-3, respectively.

In the embodiment, since the first and second compensation patterns CP1 and CP2 may be set in consideration of a ratio of the unit sensing area SUT of the inner part IS, the respective capacitance values become uniform, and thus a RC delay of the driving signal and the sensing signal can be prevented. This may contribute to an increase in recognition rate of a change in the mutual capacitance and may contribute to an increase of the accuracy of touch sensing of the touch sensing unit TSU.

According to a display device according to the embodiments, a compensation pattern is connected to an edge of a sensing electrode, the edge having an area smaller than an area of an inner part of a sensing electrode, and thus the area of the sensing electrode can be increased. Accordingly, a difference between capacitances of the sensing electrodes can be minimized or reduced, and a difference occurring in a touch sensing signal sensed from the sensing electrode can be prevented according to locations. For example, a touch sensing unit having a uniform touch sensitivity and a display device including the same can be provided.

Effects according to the embodiments are not necessarily limited by the contents illustrated above, and more various effects are included in the specification.

In concluding the detailed description, those skilled in the art will appreciate that many variations and modifications can be made to the described embodiments without substantially departing from the principles of the invention.

What is claimed is:
1. A touch sensing unit, comprising:
a first electrode including a plurality of first main patterns arranged in a first direction and a first outer pattern arranged on a side of the plurality of first main patterns;
a second electrode including a plurality of second main patterns arranged in a second direction intersecting the first direction and a second outer pattern arranged on a side of the plurality of second main patterns;
a first compensation pattern disposed within a touch peripheral area of the touch sensing unit that circum- scribes the first and second electrodes, the first compensation pattern extending along an outer edge of the first outer pattern; and
a first signal wire connected to the first outer pattern and/or the first compensation pattern,
wherein the first compensation pattern includes a first compensation connection part protruding toward the first outer pattern and the first compensation connection part is connected to the first outer pattern.

2. The touch sensing unit of claim 1, wherein the first compensation connection part at least partially overlaps the first outer pattern.

3. The touch sensing unit of claim 1, further comprising:
a touch sensing area that senses a touch; and
the touch peripheral area at least partially surrounds the touch sensing area,
wherein the first electrode and the second electrode are arranged in the touch sensing area, and the first signal wire is disposed in the touch peripheral area.

4. The touch sensing unit of claim 3, wherein the first compensation pattern includes a first compensation peripheral part disposed between the first outer pattern and the first signal wire.

5. The touch sensing unit of claim 4, wherein the first compensation periphery part is disposed within the touch peripheral area.

6. The touch sensing unit of claim 4, further comprising:
a second compensation pattern extending along an edge of the second outer pattern; and
a second signal wire connected to the second outer pattern and/or the second compensation pattern,
wherein the first compensation peripheral part is disposed between the first signal wire and the second signal wire.

7. The touch sensing unit of claim 6, further comprising a guard wire disposed between the first signal wire and the second signal wire.

8. The touch sensing unit of claim 1, wherein an area of the first compensation pattern s greater than an area of the first outer pattern.

9. The touch sensing unit of claim 1, wherein an area of the first outer pattern is smaller than an area of the first main pattern.

10. The touch sensing unit of claim 1, further comprising:
a substrate;
a first touch conductive layer disposed on the substrate;
a first touch insulating layer disposed on the first touch conductive layer; and
a second touch conductive layer disposed on the first touch insulating layer,
wherein the first touch conductive layer includes the first signal wire and the first compensation pattern, and
wherein the second touch conductive layer includes the first main pattern, the second main pattern, the first outer pattern, and the second outer pattern.

11. The touch sensing unit of claim 1, wherein the second outer pattern includes a protrusion part protruding toward the first outer pattern.

12. The touch sensing unit of claim 11, wherein the second outer pattern is disposed between the first compensation pattern and the first main pattern in the second direction.

13. A touch sensing unit, comprising:
a first electrode including a plurality of first main patterns arranged in a first direction and a first outer pattern arranged on a side of the plurality of first main patterns;
a second electrode including a plurality of second main patterns arranged in a second direction intersecting the first direction and a second outer pattern arranged on a side of the plurality of second main patterns;
a third electrode including a plurality of third main patterns arranged in the first direction and a third outer pattern arranged on a side of the plurality of third main patterns; and
a first compensation pattern disposed within a touch peripheral area of the touch sensing unit that circumscribes the first, second and third electrodes, the first compensation pattern extending along outer edges of the first outer pattern and the third outer pattern,
wherein the first compensation pattern is electrically connected to the first outer pattern.

14. The touch sensing unit of claim 13, wherein the first electrode and the third electrode are adjacent to each other in the second direction.

15. The touch sensing unit of claim 14, further comprising a second compensation pattern connected to the second outer pattern,
wherein the second compensation pattern is arranged along edges of the first outer pattern, the second outer pattern, and the third outer pattern.

16. A display device, comprising:
a display panel including a light emitting element layer including light emitting elements that emit light and a touch sensing layer disposed on the light emitting element layer; and
a window disposed on the display panel and including a light blocker,
wherein the touch sensing layer includes:
a first electrode including a plurality of first main patterns arranged in a first direction and a first outer pattern arranged on a side of the plurality of first main patterns;
a second electrode including a plurality of second main patterns arranged in a second direction intersecting the first direction and a second outer pattern arranged on a side of the plurality of second main patterns; and
a first compensation pattern disposed within a touch peripheral area of the touch sensing layer that circumscribes the first and second electrodes, the first compensation pattern connected to the first outer pattern,
wherein the first compensation pattern at least partially overlaps the light blocker.

17. The display device of claim 16, wherein the first compensation pattern includes a first compensation peripheral part extending along an outer edge of the first outer pattern and a first compensation connection pan protruding from the first compensation peripheral part to the first outer pattern and connected to the first outer pattern.

18. The display device of claim 17, wherein the first compensation peripheral part at least partially overlaps the light blocker.

19. The display device of claim 18, wherein at least a first portion of the first compensation connection part overlaps the light blocker.

20. The display device of claim 19, wherein at least a second portion of the first compensation connection part overlaps the first outer pattern.

* * * * *